(12) United States Patent
Tabanelli

(10) Patent No.: US 8,630,730 B2
(45) Date of Patent: Jan. 14, 2014

(54) MACHINE AND METHOD FOR CUTTING

(75) Inventor: Giorgio Tabanelli, Cotignola (IT)

(73) Assignee: Sica S.p.A., Alfonsine (IT)

( * ) Notice: Subject to any disclaimer, the term of this patent is extended or adjusted under 35 U.S.C. 154(b) by 952 days.

(21) Appl. No.: 12/665,048

(22) PCT Filed: Jun. 24, 2008

(86) PCT No.: PCT/IB2008/001708
§ 371 (c)(1),
(2), (4) Date: Jan. 22, 2010

(87) PCT Pub. No.: WO2009/001210
PCT Pub. Date: Dec. 31, 2008

(65) Prior Publication Data
US 2010/0180736 A1 Jul. 22, 2010

(30) Foreign Application Priority Data

Jun. 27, 2007 (IT) .............................. RN2007A0034

(51) Int. Cl.
*G06F 19/00* (2011.01)
(52) U.S. Cl.
USPC .................................. 700/171; 82/48; 83/880
(58) Field of Classification Search
USPC .................................. 700/171; 82/48; 83/880
See application file for complete search history.

(56) References Cited

U.S. PATENT DOCUMENTS

| | | | | |
|---|---|---|---|---|
| 2,521,004 | A | * | 9/1950 | Gitter ................................ 82/48 |
| 2,777,520 | A | * | 1/1957 | Grzenkowski et al. ........... 82/48 |
| 4,494,435 | A | * | 1/1985 | Lindsay .......................... 83/880 |
| 4,653,364 | A | | 3/1987 | Savioli |
| 5,224,368 | A | | 7/1993 | Schach |
| 2008/0202299 | A1 | | 8/2008 | Kudrus |

FOREIGN PATENT DOCUMENTS

| | | |
|---|---|---|
| DE | 2361405 A1 | 6/1974 |
| DE | 3718886 A1 | 12/1988 |
| DE | 10119676 A1 | 10/2002 |
| EP | 0129515 A | 12/1984 |
| EP | 1356904 A | 10/2003 |
| EP | 1955798 A2 | 8/2008 |
| GB | 1392637 A | 4/1975 |
| IT | RN2003A000014 | 11/2004 |

* cited by examiner

*Primary Examiner* — Mohammad Ali
*Assistant Examiner* — Ziaul Karim
(74) *Attorney, Agent, or Firm* — Pearne & Gordon LLP

(57) ABSTRACT

A machine for cutting a continuously extruded tube into segments of lesser and predetermined length, comprising: —means (33) for actuating sliding means (3) that are movable along a guide (30) parallel to a direction (20) of advance; said sliding means (3) comprising a first and a second station (31, 32) for cutting the tube which in turn comprise respectively a first and a second shearing cutter (311, 312). To the first shearing cutter (311) is associated a first cutting plane (310) transverse to the direction (20) of advance of the tube, to the second shearing cutter (312) is associated a second cutting plane (320) that is transverse to the direction (20) of advance of the tube and distal from the first cutting plane (310);—means for measuring the relative displacement between said tube and said first and second cutting plane (310, 320) along the direction (20) of advance of the tube;—control means commanding said actuating means (33) of said sliding means (3) according to the desired length of the segments produced by the machine (1) and according to the information provided by said measuring means.

33 Claims, 10 Drawing Sheets

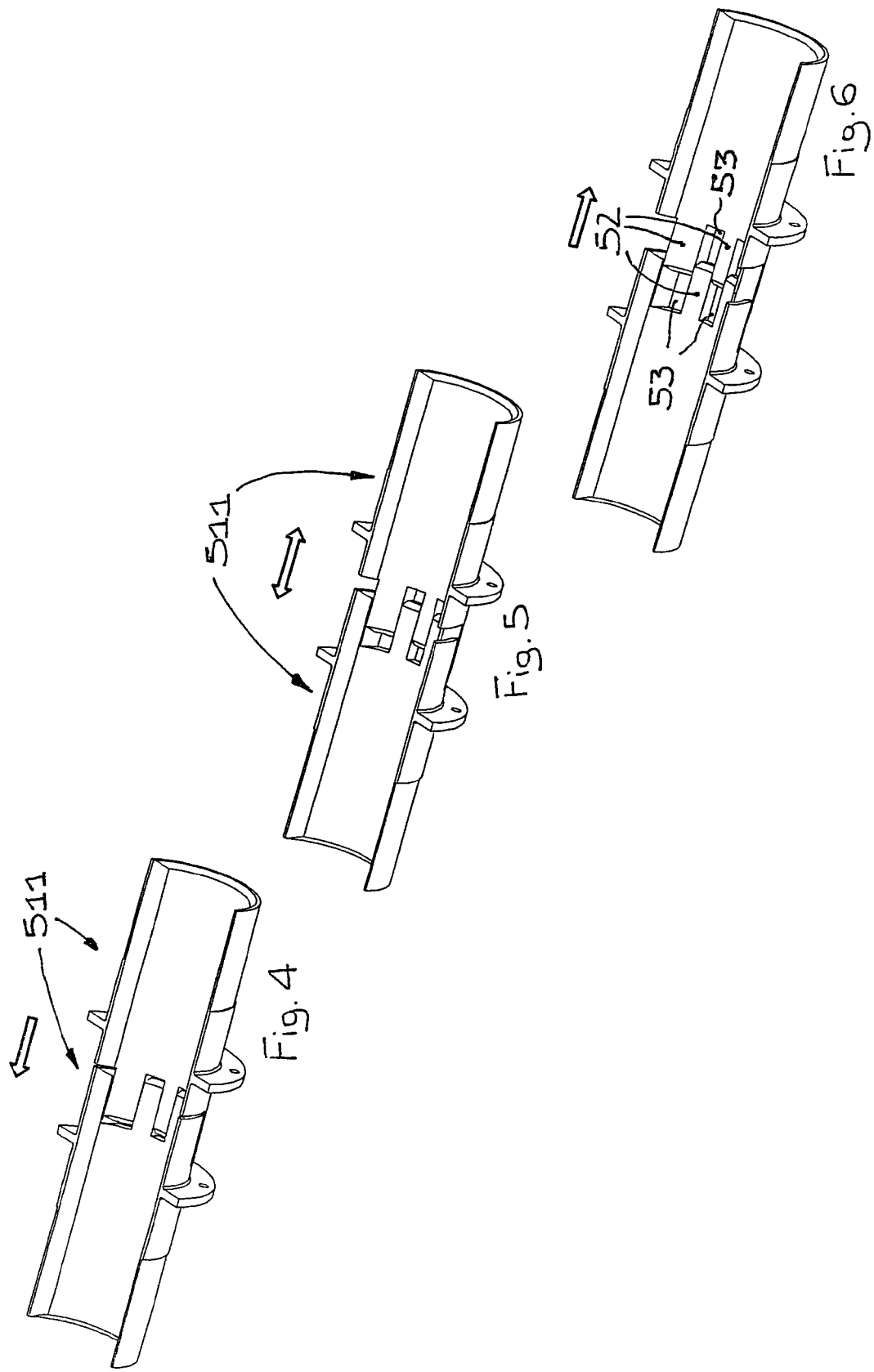

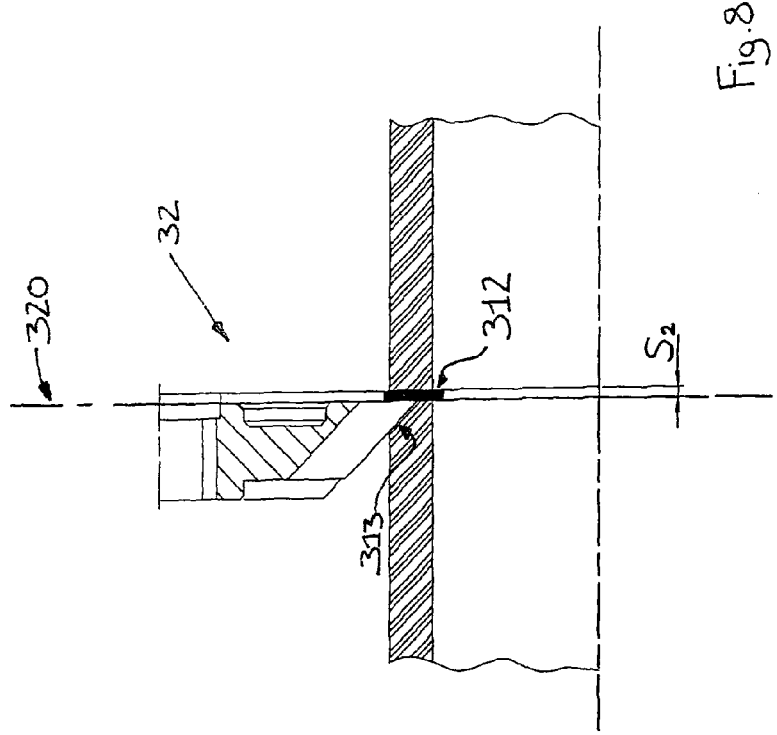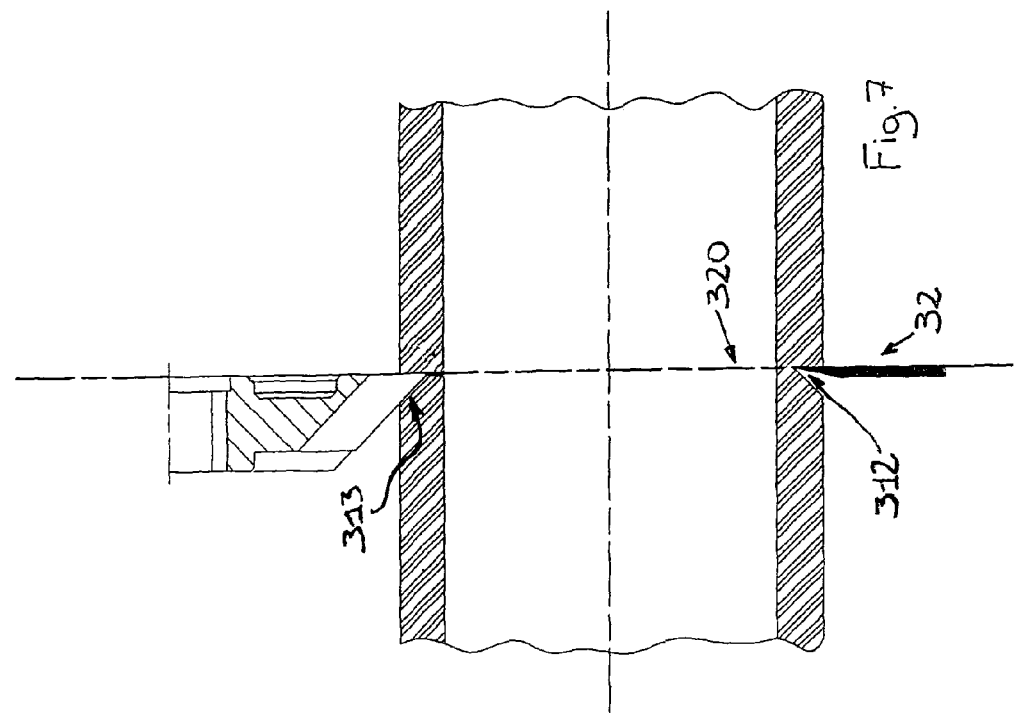

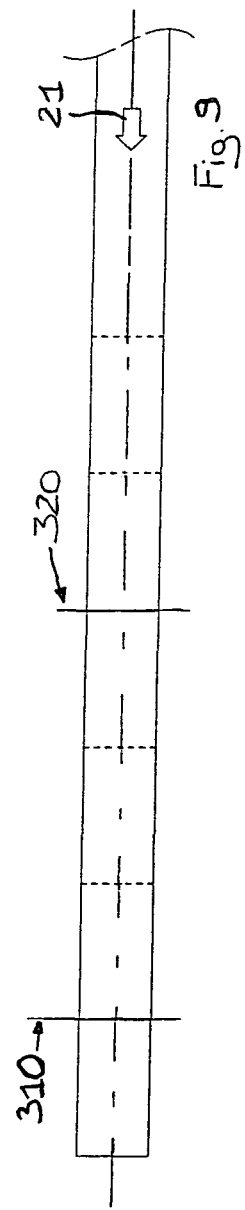
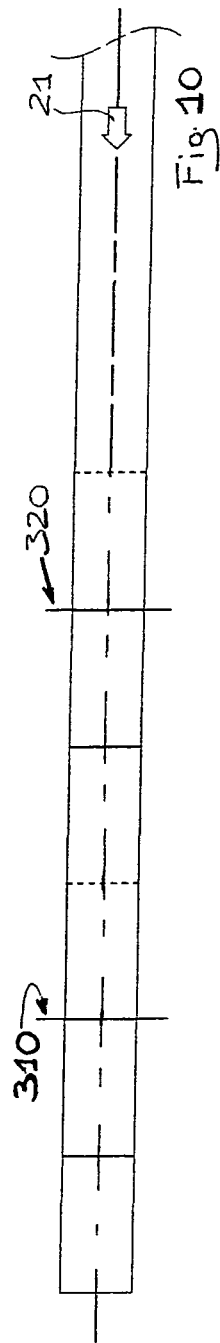
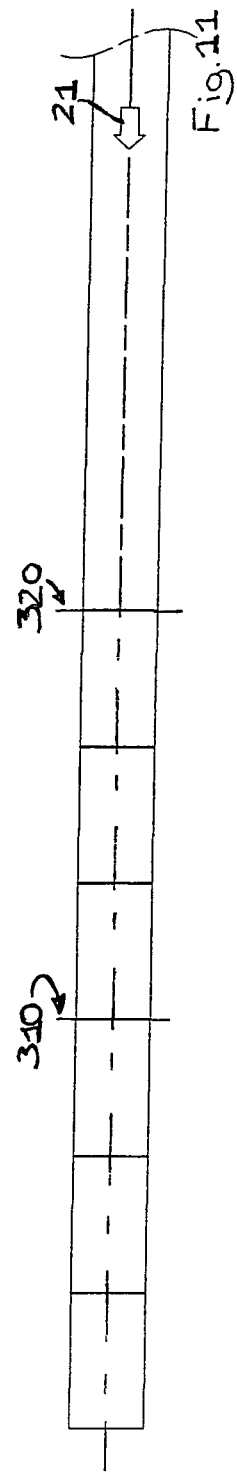

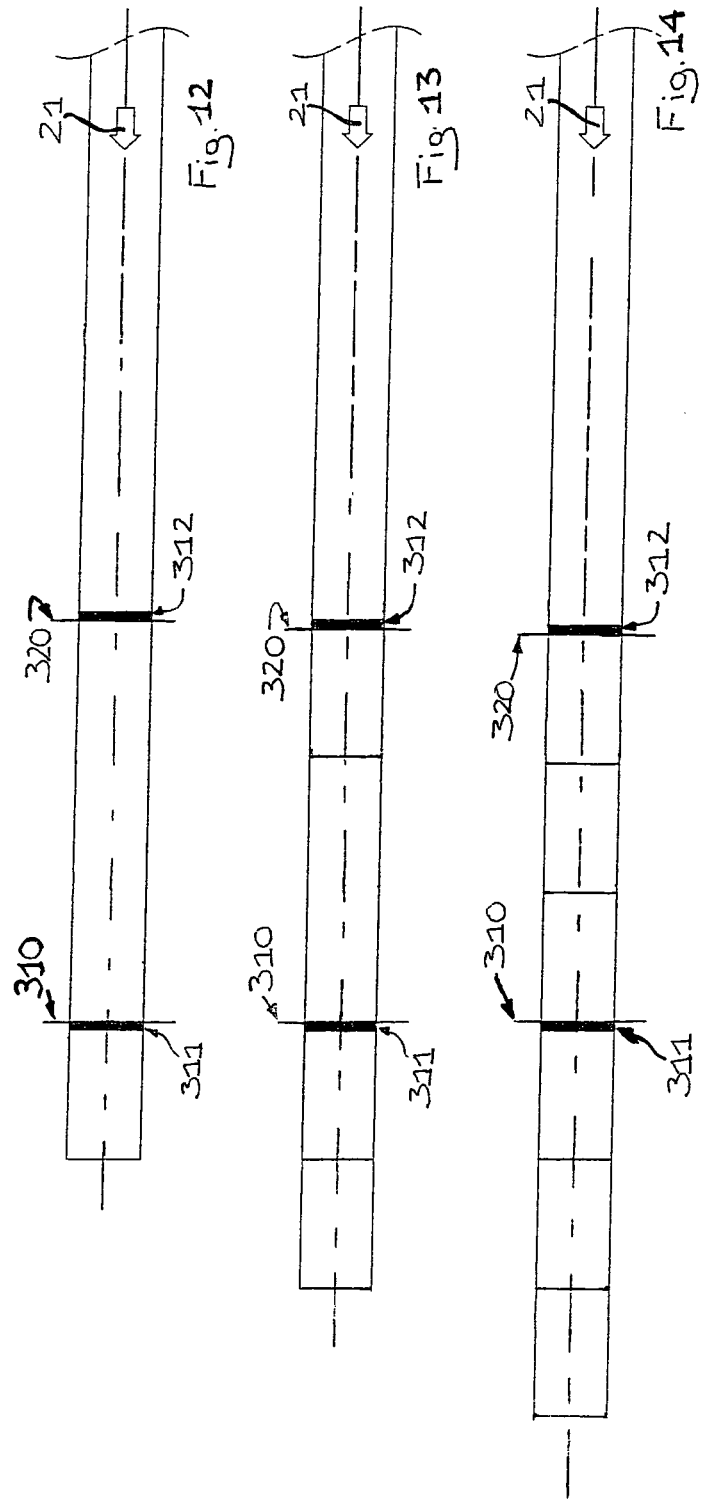

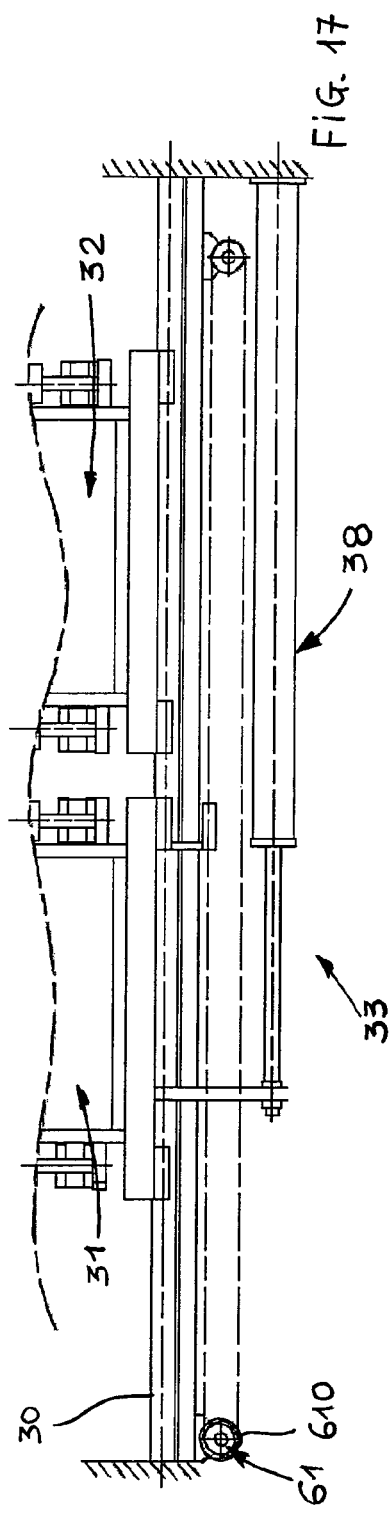
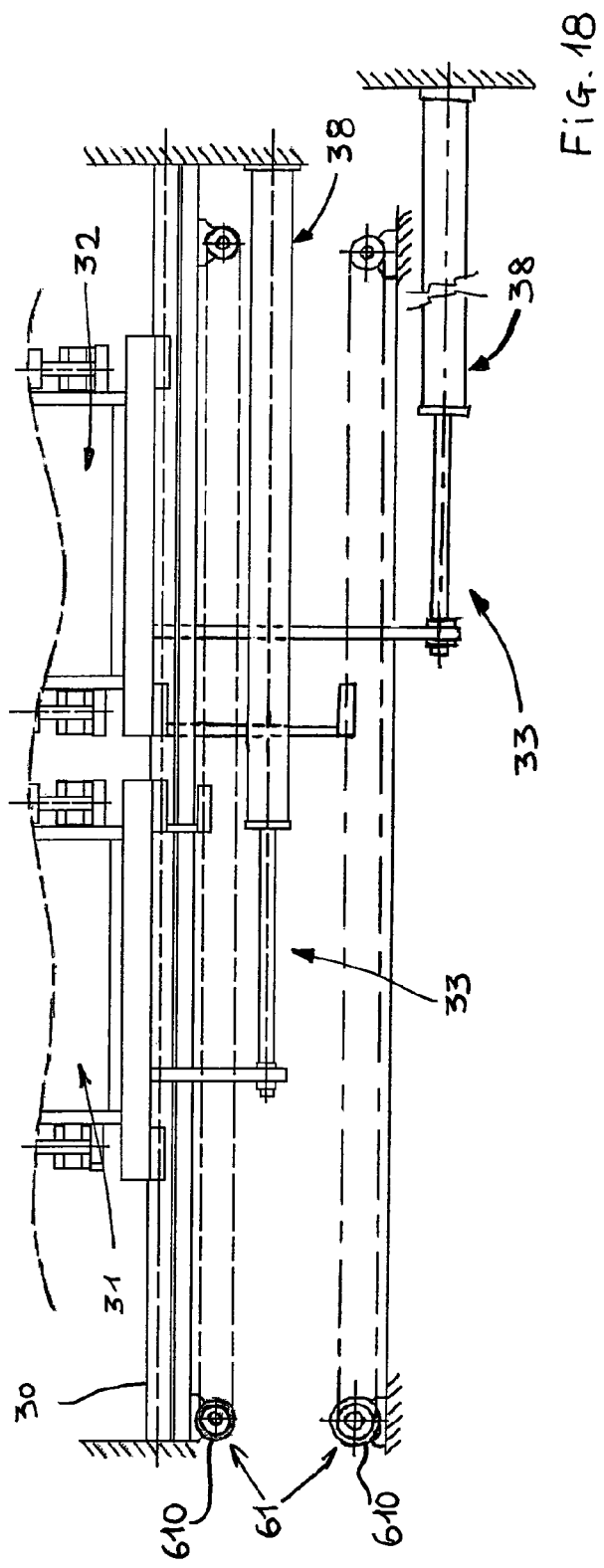

MACHINE AND METHOD FOR CUTTING

TECHNICAL FIELD

The present invention relates to a machine and method for cutting an extruded tube into segments of lesser and predetermined length.

BACKGROUND ART

In drainage pipeline systems within buildings, plastic tubes are widely used, in particular made of PVC-U (rigid polyvinyl chloride), PP (polypropylene) and PE (polyethylene). In these systems, referring to the metric dimensions, the outer tube diameters employed rarely exceed 200 mm, whilst the smallest diameter used is normally 32 mm The commercial lengths of the tubes are short relative to the tubes used in sewers or in pressurised fluid distribution pipelines, because the structure of the building is poorly suited to the installation of tubes longer than 3 metres. Commonly employed lengths, normally available on the market, are: 150 mm, 250 mm, 500 mm, 750 mm, 1000 mm, 1500 mm, 2000 mm and 3000 mm. The most widely used technique for joining tubes is the bellmouth with a sealing elastomeric gasket: the end of the tube is widened and provided with a seat for a gasket, in order to enable the insertion of another tube into the end, achieving a junction with fluid-dynamic tightness.

The end of the tube that is inserted into the bellmouth is chamfered, so insertion into the bellmouth is facilitated and the risks of damaging the gasket are reduced. The nominal commercial length of the tube with bellmouth does not consider the bellmouth portion, because the length of the bellmouth is irrelevant in calculating the extension of the pipeline. Tubes with bellmouths at both ends also have considerable commercial success.

Plastic tube production lines are extrusion lines with continuous production in which the extruded tube advances along the line at uniform velocity (extrusion velocity). In the line is normally present an automatic cutting machine, commanded by an electronic control unit, able to obtain tube segments with chamfered end. The length of the cut segments corresponds to the nominal commercial length plus a segment with sufficient length to obtain, with subsequent bellmouth making machine, with thermoforming process, the bellmouth. In draining tubes within buildings, the products most on demand are short tubes, usually tubes having commercial length of up to 500 mm.

The traditional automatic cutting machine is configured as a carriage that moves within a frame along the axis of the tube. Within the carriage is located a drum comprising two rings, separated by spacers, within which is obtained a cavity that is coaxial to the tube. In the drum is located the cutting tool. The drum is able to rotate at high velocity around the tube. Since the tube is in constant rectilinear motion, when the cut is performed the carriage must also move at the same velocity as the tube. At the time the cut is executed, two clamps positioned on the carriage at the side of the cutting assembly, close on the tube, achieving a rigid carriage-tube structure that moves at the same velocity, thereby allowing maximum cutting precision. The electronic control unit receives the signal that commands the execution of the cutting cycles from an electronic position measurer that, through an electro-mechanical transducer (wheel-encoder), constantly measures the velocity of the tube and the required lengths of tube to be cut.

When the cut is commanded, the carriage starts from a motionless condition and from a starting position, follows and reaches the point to be cut, synchronises to the velocity of the tube, closes the clamps and through the cutting tool performs the cutting cycle. Once the cut is completed, the clamps release the tube and the carriage returns to the starting position, awaiting another cutting command. It is evident that the higher the extrusion velocity, the greater will be the length of travel needed by the carriage to complete the work cycle. It is also evident that, for equal extrusion velocity, the shorter the lengths of tube required, the greater will be the number of cuts the machine must execute in a unit of time. To limit the length of the working stroke of the carriage and increase, for equal stroke available, the number of producible short segments, the so-called "flying" cut technique described in the patent EP 0129515 is advantageous. This technique enables to achieve working cycles characterised by sequences of short segments alternating to a long segment. With the "flying cut" control technique, the carriage provided with a shearing cutter does not take as a reference the absolute stroke-start position, but the relative position on the tube where the next cut is to be executed with respect to the instantaneous position of the carriage. By so doing, after the first cut, the carriage in the return stroke does not return to a stroke-start position, but when it arrives in the vicinity of the position of the tube where the next cut is to be executed, it stops "on the fly", it reverses its motion and it reaches the cutting point, it synchronises the velocity with the extrusion velocity and it carries out the cutting cycle, and so on until the end of the working stroke. After completing the working stroke, the carriage returns to the stroke-start position and from said position it can cut a long segment and then resume the sequence of cuts "on the fly" that produce the short segments.

The technical evolution of the extrusion lines is characterised by a constant increase of the extrusion velocity, whilst the application of drainage tubes in buildings requires prevalently short segments with bellmouths. To meet this requirement, no relevant problems are associated with installing at the end of the extrusion line multiple bellmouth-making machines, able to sustain the arrival in a given time of an ever greater number of tubes to be shaped with bellmouth ends. However, it is necessary to increase ever more the velocity with which the tube segments are produced in order to keep pace with the velocity of extrusion of the tubes.

DISCLOSURE OF THE INVENTION

An object of the present invention is to overcome the drawbacks described above, making available a machine and a method for cutting an extruded tube into segments with a lesser and predetermined length which enables to obtain a high machining rate.

Another object of the present invention is to make available a machine and a method for cutting an extruded tube into segments with a lesser and predetermined length which enables to obtain relatively small bulks.

These objects and others beside, which shall become more readily apparent in the description that follows, are achieved, in accordance with the present invention, by a machine and a method for cutting an extruded tube into segments of lesser and predetermined length having structural and functional characteristics in accordance with the appended independent claims, additional embodiments thereof being identified in the appended and corresponding dependent claims.

BRIEF DESCRIPTION OF THE DRAWINGS

The invention is described in greater detail hereafter with the aid of the drawings, which represent an embodiment provided purely by way of non limiting example.

FIGS. 4, 5, 6 show distinct configurations of a detail of the machine according to the present invention.

FIGS. 7, 8, show two distinct constructive solutions of a detail of a machine according to the present invention.

FIGS. 9, 10, 11 show some sequences of the machining of the tube.

FIGS. 12, 13, 14 show some sequences of the machining of the tube if the shearing scraps are not neglected.

FIG. 17 shows a detail of an alternative embodiment of the motion transmission responsible for the reciprocating translation of the sliding means along their guide in the case of FIG. 2 and/or FIG. 15.

FIG. 18 shows a detail of an alternative embodiment of the motion transmission responsible for the reciprocating translation of the sliding means along their guide in the case of FIG. 16.

In the figures the same components are indicated by the same reference numbers.

DETAILED DESCRIPTION OF THE PREFERRED EMBODIMENTS OF THE INVENTION

Figure 1:
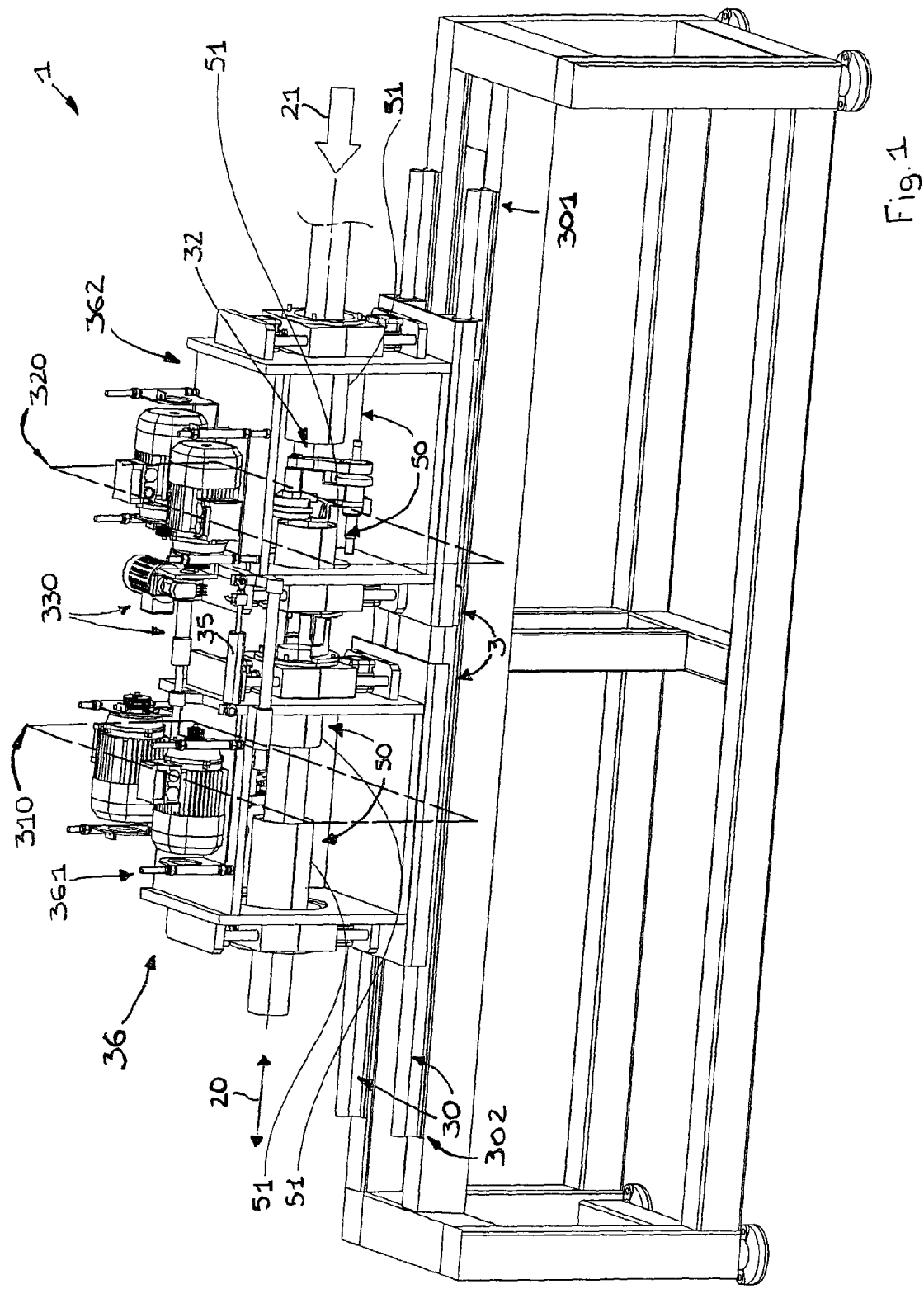
FIG. 1 shows a perspective view of a machine according to the present invention.

With reference to FIG. 1, the number 1 indicates a machine for cutting a tube extruded in continuous fashion into segments of a lesser and predetermined length. Advantageously, said machine 1 houses the tube generated by a continuous extruder positioned upstream (the extruder is not shown).

In the present description, the term "tube" means generically the set both of the cut segments, still operatively fastened to the machine 1, and of the part of tube not yet cut into segments.

Figure 2:
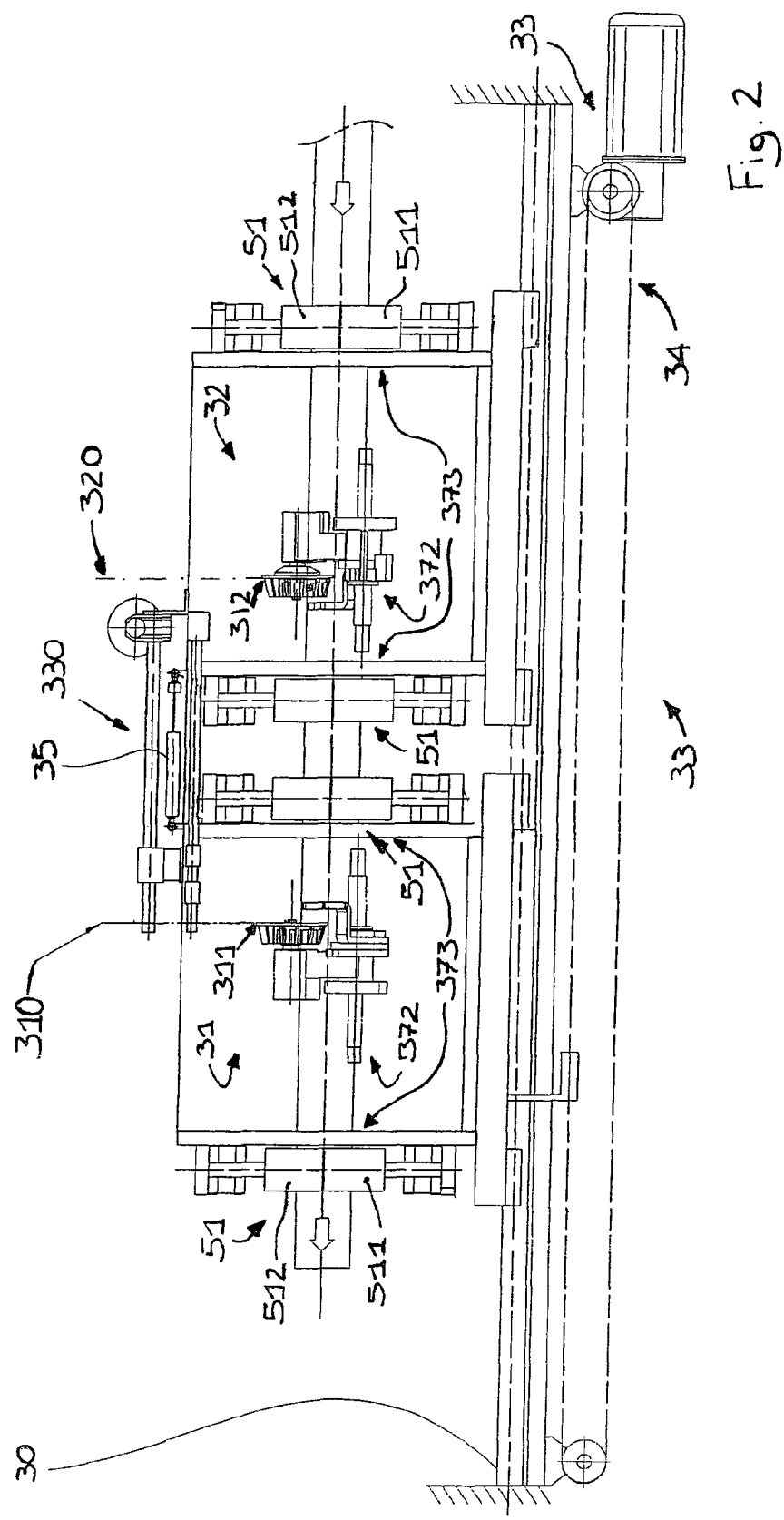
FIG. 2 shows a schematic view of a portion of the machine according to the present invention.

The machine 1 comprises a guide 30 that develops between a stroke-start 301 and a stroke end 302. The cutting machine 1 also comprises sliding means 3 that are movable along the guide 30 parallel to a direction 20 of advance of the tube along which the tube is to proceed according to a first sense of advance 21 oriented from the stroke-start 301 to the stroke end 302 of the guide 30. The tube moves along said first sense of advance 21 with its own velocity; said velocity is generally imposed by a suitable driving device (not shown) interposed between the cutting machine 1 and the extruder upstream. The machine 1 further comprises means 33 for actuating said sliding means 3 along said guide 30. Said sliding means 3, under the action of the actuating means 33, move both forward and backward along the guide 30. As schematically shown in FIG. 2, the actuating means 33 comprise a motion transmission 34 comprising a belt integral with a portion of the sliding means 3, closed in a loop on itself and wound around a pair of pulleys. Said motion transmission 34 is responsible for the reciprocating translation of the sliding means 3 along the guide 30.

Alternatively (solution not shown herein), the actuating means 33 comprise a fluid-dynamic jack that actuates the sliding means 3.

FIGS. 17 and 18 schematically illustrate that the sliding means 3 may be actuated by actuating means 33 comprising one or more fluid-dynamic jacks (herein indicated by the reference numeral 38). In particular, in FIG. 17 the sliding means 3 are actuated by a fluid-dynamic jack 38. In general, the jacks used could also be of a different type, for example electromagnetic jacks.

The sliding means 3 comprise a first station 31 for cutting the tube, said first cutting station 31 comprising a first shearing cutter 311 defining a first cutting plane 310 transverse to the direction 20 of advance of the tube. Advantageously, the first cutting plane 310 is orthogonal to the direction 20 of advance of the tube.

The sliding means 3 further comprise a second station 32 for cutting the tube positioned upstream of the first cutting station 31 with respect to the first sense 21 of advance of the tube along the direction 20 of advance, said second cutting station 32 comprising a second shearing cutter 312 distanced from the first shearing cutter 311 and defining a second cutting plane 320 that is transverse to the direction 20 of advance of the tube.

The first and the second shearing cutter 311, 312 are mutually distinct and separate.

Advantageously, the second cutting plane 320 is orthogonal relative to the direction 20 of advance of the tube.

Advantageously, the first and the second cutting plane 310, 320 are mutually parallel.

The cutting action of the first and of the second shearing cutter 311, 312 can take place at least partly simultaneously, but it preferably takes place wholly simultaneously.

The term "shearing cutter" means the portion of the corresponding cutting station which interacts physically with the tube, determining its split into two distinct, independent portions. A portion 313 of the cutting station that executes a simple chamfer, but does not split the tube into two parts, is not a part of the shearing cutter. See in this regard FIG. 8. This chamfer is advantageously used to facilitate the connection by insertion of two distinct segments whereof at least one has a bellmouth end. Advantageously, both the first and the second shearing cutter 311, 312 are constituted by a tool that can be a blade (see FIG. 7) or a rotating disk (see FIG. 8). To the shearing cutter can also be associated the portion 313 of the cutting station necessary to execute a conical chamfer.

The sliding means 3 comprise means 50 for gripping tube portions, said gripping means 50 being positioned, relative to the first sense of advance 21 of the tube, at least upstream of the first cutting plane 310, downstream of the second cutting plane 320 and between the first and the second cutting plane 310, 320. The gripping means 50 are movable between a first configuration in which they securely grip corresponding tube portions and a second configuration in which they release said tube portions.

The cutting machine 1 further comprises means for controlling the actuating means 33 and means for measuring the relative displacement between said tube and said first and second cutting plane 310, 320 along the direction of advance 20 of the tube. Before every cut and on the command of the control means, the actuating means 33 are able to synchronise with the motion of the tube the motion of each cutting station 31, 32 along the direction of advance 20, positioning the first and the second cutting plane 310, 320 at desired positions on the tube. The control means command the means 33 for actuating said sliding means 3 at least as a function:

of the information provided by said measuring means;
of the desired length of the tube segments to be produced with the machine 1.

Once the synchronisation is completed, before each cut, said gripping means 50 assume said first configuration to keep in position tube segments positioned at the first and at the second cutting plane 310, 320. Said second configuration is assumed after each cut to allow the relative motion of the tube and of the sliding means 3 along the direction 20 of advance of the tube.

In said second configuration, therefore, the relative displacement of the cutting stations 31, 32 with respect to the tube is possible. The action of the gripping means enables to maximise the cutting precision preventing undesired displacements between the tube and the first and/or the second shearing cutter 311, 312.

The control means comprise a controller (for example a programmable logic controller, or "PLC"). The controller commands the actuating means 33.

The machine 1 comprises a central electronic unit which manages the operations of the machine 1 itself. The control means are governed by the central electronic unit. The controller may be integrated into the central electronic unit.

Figure 15:
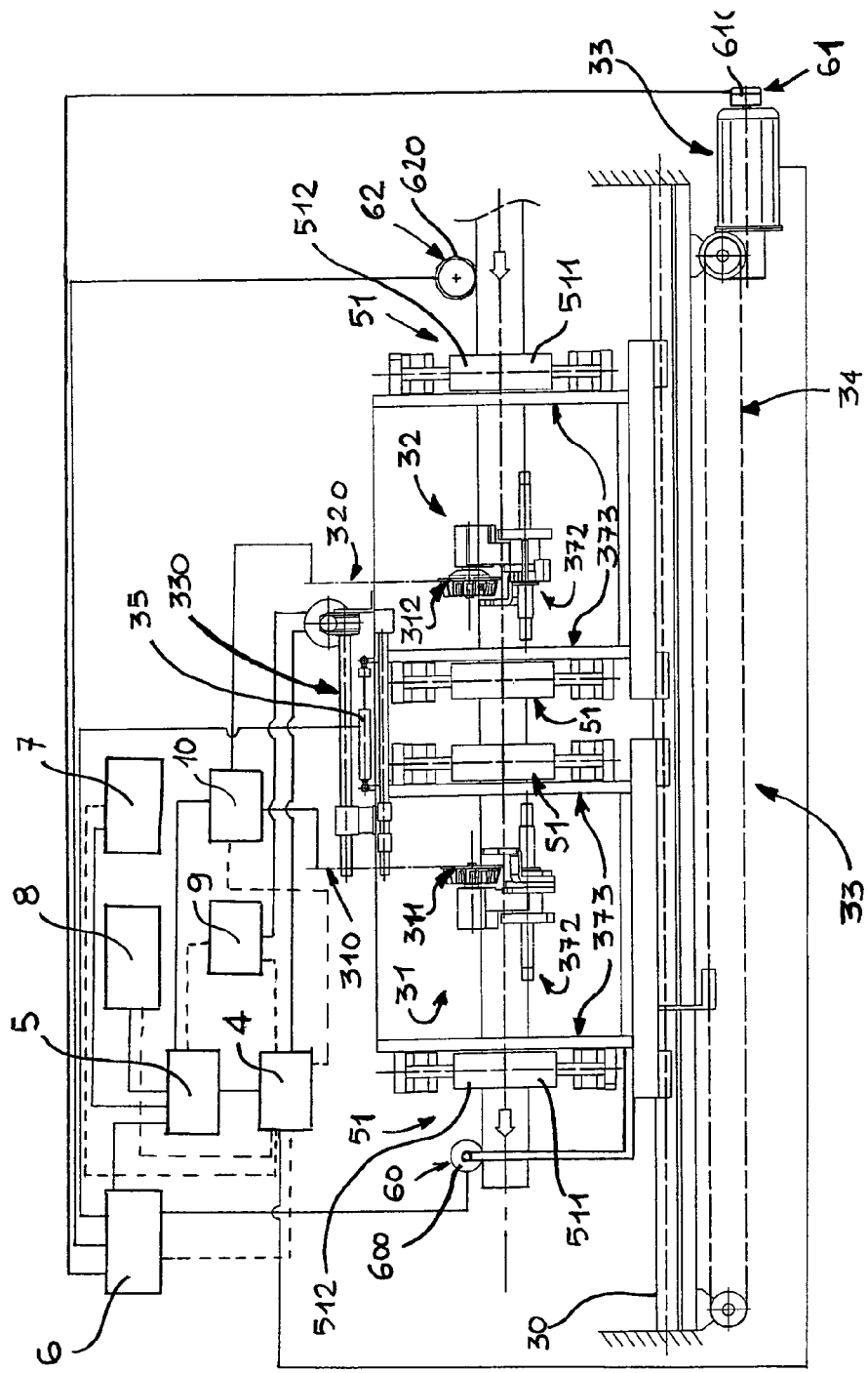
FIG. 15 shows the portion of the machine illustrated in FIG. 2, with the schematic representation of some further details of the machine itself.
Figure 16:
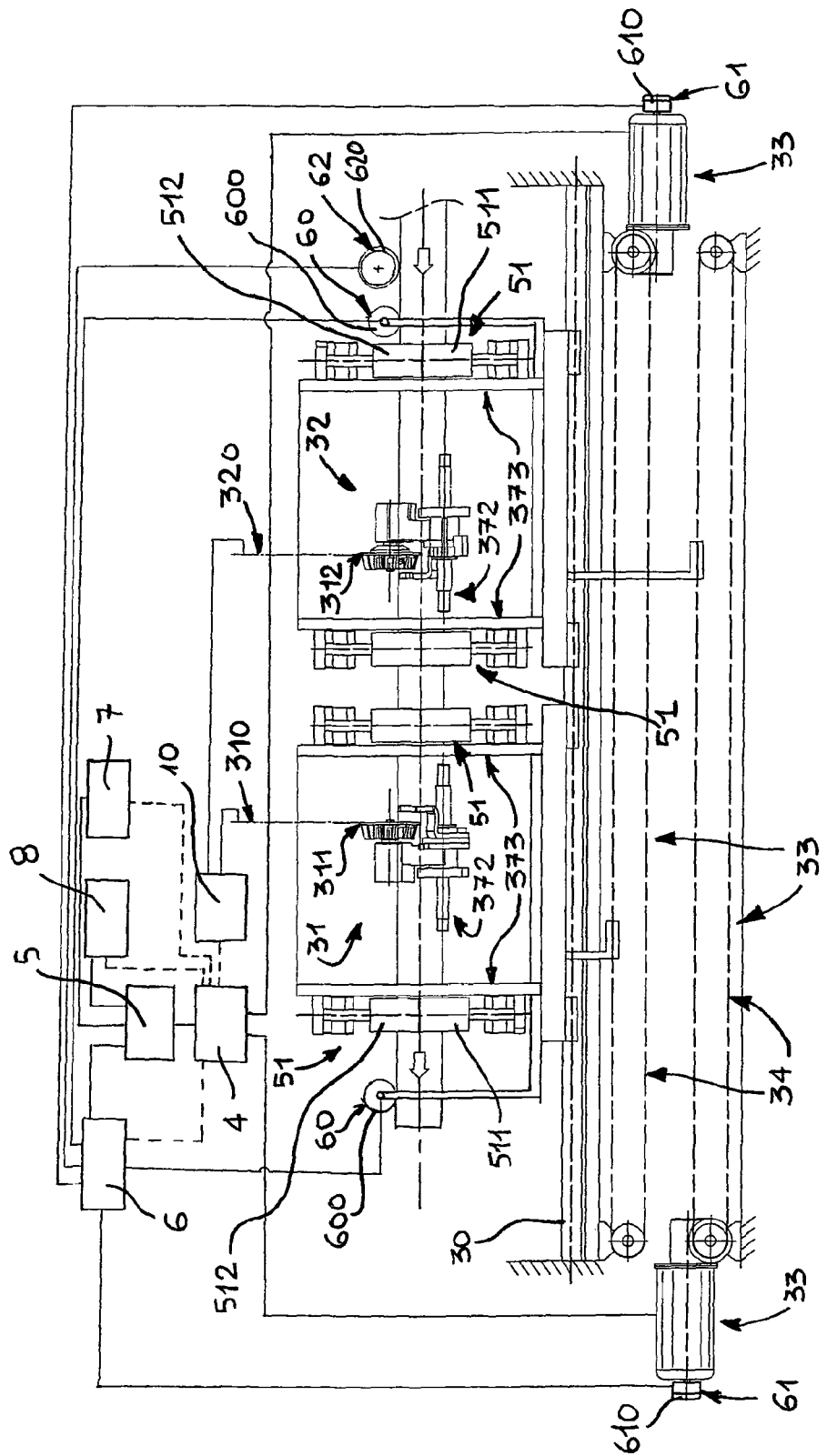
FIG. 16 shows a schematic view of the machine of the invention equivalent to the ones in FIG. 2 and in FIG. 15, illustrating an alternative embodiment of the sliding means.

The control means and the central electronic unit are schematically represented in FIG. 15 and in FIG. 16 by respective boxes, indicated in turn by the reference numerals 4 and 5 respectively.

The measuring means are so structured as to permit the direct detection or the calculation of the relative position of the tube and of the first and second cutting planes 310, 320. With reference in particular to FIG. 15, the measuring means may comprise a first transducer 60 which directly detects the relative displacement between the tube and the first and the second cutting plane 310, 320. The first transducer 60 may be embodied by an encoder 600, which is supported by the sliding means 3 and contacts the tube. An example of this type of sensing device structure is illustrated in Patent EP 0 129 515. Alternatively, or contemporarily, the measuring means may comprise a second transducer 61 which detects the absolute displacement of the sliding means 3 and a third transducer 62 which detects the absolute displacement of the tube. The signals of the second and of the third transducers 61, 62 may then be used to calculate the relative displacement between the tube and the first and the second cutting planes 310, 320. The second transducer 61 may be embodied by an encoder 610. This encoder 610 may be integrated in a motor which drives the motion transmission 34 (as illustrated in FIGS. 15 and 16), or it may be put in contact with the sliding means 3 or with parts thereof, either directly or through various mechanical systems (as schematically illustrated for example in FIGS. 17 and 18). The third transducer 62 may be embodied by an encoder 620 which contacts the tube. This encoder 620 may be supported by a fixed part of the machine 1. Alternatively, this encoder 620 may be integrated in the driving device (not shown) driving the tube away of the extruder.

In FIGS. 15 and 16 the measuring means are globally represented as a box, indicated by the reference numeral 6 and shown connected by continuous lines to the various transducers described above and in the following.

The measuring means exchange information with the control means. This may be carried out either directly or via the central electronic unit.

The sliding means 3 according to the present invention could also comprise more than two cutting stations 31, 32. In this case, to each cutting station should be associated a corresponding cutting plane. For the sake of simplicity, hereafter reference shall be made to the preferred solution that comprises two cutting stations 31, 32, the same concepts being extendable automatically to the solution with more than two cutting stations (this latter solution being advantageous especially with tubes of small diameter).

In the machining of polypropylene and polyethylene tubes for drains to be used within buildings, the cutting operation usually takes place without production of shear scraps. On the contrary, the cutting operation on rigid polyvinyl chloride tubes usually takes place with production of shear scraps. The term "shear scraps" means the portion of the tube that is removed by the shearing cutter and that does not remain attached to either of the two segments generated by the cut. FIG. 7 shows a cut without production of scraps, whilst FIG. 8 shows a cut with the production of a shear scrap by the second shearing cutter 312.

The machine 1 comprises means for positioning the first and the second cutting plane 310, 320 at a mutual distance defined by the following formula:

$$n \cdot L + K$$

where:
- n: is a natural number greater than 0;
- L: is a preferential length of the desired tube segments outputted by the machine, measured along the direction of advance 20 of the tube;
- K: is a first corrective coefficient to take into account the length, measured along the direction of advance of the tube, of a scrap generated by the first and/or by the second shearing cutter 311, 312 along the direction 20 of advance of the tube.

The natural number n takes into account the fact that from the tube portion interposed between the first and the second cutting plane 310, 320 and obtained from the cut executed simultaneously by the first and by the second shearing cutter 311, 312, a number of segments of equal length L equal to the natural number n will be obtained. Advantageously, the value of the natural number n is greater than 1.

If one considers negligible the scrap generated by the first and by the second shearing cutter 311, 312, the first corrective coefficient K is advantageously equal to 0. Usually, the thickness of the first and of the second shearing cutter 311, 312 is variable from 0 to 3 mm.

If one does not consider negligible the scrap generated by the first and by the second shearing cutter 311, 312, it is necessary to consider that to each shearing cutter 311, 312 are associated multiple shearing planes included in an interval defined by the length of the scrap generated by the corresponding shearing cutter 311, 312 along the direction 20 of advance of the tube. The first and the second cutting plane 310, 320 coinciding with the two shearing planes mutually closest and generated at least in part simultaneously one by the first shearing cutter 311 and one by the second shearing cutter 312.

Constant reference shall be made hereafter to this definition of the cutting planes 310, 320 in order to evaluate univocally the values of the corrective coefficients pertaining to the length of the scrap measured along the direction 20 of advance. By virtue of the way the cutting planes 310, 320 are defined and as a function of the subsequent steps provided by the method implemented by the machine 1, in the formula n·L+K (previously indicated), if one wants to take into account the scrap generated by the shearing cutters 311, 312, it will be necessary to take into account only the scrap generated by the first shearing cutter 311. In this case, the first corrective coefficient is equal to the length of the scrap generated by the first shearing cutter 311 along the direction 20 of advance multiplied by n−1 where n is the aforesaid natural number. From this it is evident that if n is equal to 1, the first corrective coefficient K is nil.

In FIGS. 15 and 16 the positioning means are schematically represented as a box, indicated by the reference numeral 10 and connected by continuous lines to the first and second cutting plane 310, 320.

A control system acts on the first and on the second cutting plane 310, 320, to make it possible to position the first and the second cutting plane 310, 320 at a mutual distance defined by the above mentioned formula: n·L+K. The control system acts on the first and on the second cutting plane 310, 320 to make it possible to keep the first and the second cutting plane 310, 320 at a mutual distance defined by the above mentioned formula: n·L+K.

The control system may include the control means and may exploit their capability to effect the positioning of the first and of the second cutting plane 310, 320 via the actuating means 33. The actuating means 33 and the related control means may be used to locate the first and the second cutting plane 310, 320 at a required mutual distance.

The cutting machine 1 further comprises a user interface to set the value of the preferential length L of the desired tube segments outputted by the machine 1. The preferential length L is the target length which the machine 1 is to produce. The user interface may be for example a keyboard and/or a video-terminal. The user interface sends information to the control means. This may be carried out either directly or via the central electronic unit.

The user interface is schematically represented in FIGS. 15 and 16 as a box, indicated by the reference numeral 7.

A number of segments of a length equal to said preferential length is usually alternated by the generation of a segment of greater dimensions. This depends both on the fact that the guide 30 has a finite development and on the operating procedures of the cutting machine 1 (as better explained below). Advantageously, the length of said segment of greater dimension can also be pre-set (e.g. to create a stock of segments of this length). These long segments are in any case usually generated in a smaller number than the segments of preferential length L and their generation constitutes a way to try to optimise the production of the machine 1.

The machine 1 further comprises an electronic unit that enables to determine the value of the natural number n as a function of the value of the length L of the desired segments and of pre-set geometric parameters of the machine 1. In particular, the value of n should be the smallest possible, taking into account the maximum and minimum mutual distance whereat it is possible to position the first and the second cutting plane 310, 320. This is linked to the need to limit the length of the stroke which the sliding means 3 must have available. The maximum and minimum mutual distance whereat it is possible to position the first and the second cutting plane 310, 320 is a function of the constructive geometric parameters of the machine 1 and they are values that characterise a machine 1 and hence are known beforehand.

In FIGS. 15 and 16 the electronic unit is schematically represented as a box, indicated by the reference numeral 8. The electronic unit exchanges information with the control means. This may be carried out either directly or via the central electronic unit. The electronic unit may be integrated in the central electronic unit.

Advantageously, the actuating means 33 comprise means 330 for regulating the mutual distance of the first and of the second cutting plane 310, 320. For example, the regulating means 330 enable to change the distance between the first and the second cutting plane 310, 320 and consequently they can change the length of the desired tube segments outputted by the machine 1.

The regulating means 330 may therefore be used to locate the first and the second cutting plane 310, 320 at a required mutual distance.

A part of the positioning of the first and the second cutting plane 310, 320 at a required mutual distance may be carried out also by making the position of the first shearing cutter 311 in the first cutting station 31 and/or the position of the second shearing cutter 312 in the second cutting station adjustable along the direction 20 of advance of the tube.

Advantageously, the machine 1 comprises a remote centre for controlling the regulating means 330 which enables to activate the regulating means 330 without stopping the machine 1.

In FIG. 15 the remote control centre is schematically represented as a box, indicated by the reference numeral 9. The remote control centre may be part of the control means. It may be connected to and/or integrated into the central electronic unit.

As exemplified in FIG. 1, the sliding means 3 comprise a carriage 36 comprising a first and a second portion 361, 362 that are mutually movable by the regulating means 330. On the first portion 361 of the carriage 36 is obtained the first cutting station 31, on the second portion 362 of the carriage is obtained the second cutting station 32. Advantageously, the regulating means 330 are physically interposed between the first and the second portion 361, 362 of the carriage. The regulating means 330 thus also enable the physical connection between the first portion 361 and the second portion 362 of the carriage 36. Usually, the regulating means 330 comprise electromechanical systems or fluid-dynamic jacks. Advantageously, the measuring means comprise a position transducer 35 that measures the relative displacement of the first and of the second cutting station 31, 32.

By intervening on the regulating means 330, it is thus possible to move mutually closer or farther away the first and the second portion 361, 362 of the carriage 36 and hence the first and the second cutting station 31, 32 and hence the first and the second cutting plane 310, 320.

In an alternative embodiment, the sliding means 3 comprise:
  a first carriage movable along said guiding means 30, on said carriage being obtained the first cutting station 31;
  a second carriage, movable parallel to the direction 20 of advance of the tube, on said second carriage being obtained the second cutting station 32;
  said first and second carriage are physically disengaged from each other at least along the direction 20 of advance of the tube. Therefore, no means 330 for regulating the mutual distance are physically interposed between the first and the second carriage. The first and the second carriage are provided with distinct actuating means 33 controlled by the command centre, the latter regulating also the mutual actuation of the first and of the second carriage.

In general, in the machine 1 the control means command the actuating means 33, to effect positioning of the first and the second cutting plane 310, 320 at desired positions on the tube. Therefore they may be used to control the mutual positioning of the first and the second cutting plane 310, 320. The first and the second carriage being physically disengaged from each other, the actuating means 33 used to move the first and the second carriage along the guide 30 may be used as regulating means 330. This is effected under the command of the control means (of the command centre).

As schematically shown in FIG. 16, the actuating means 33 comprise a motion transmission 34 for each carriage. Each motion transmission 34 comprises a belt integral with a portion of the sliding means 3, closed in a loop on itself and wound around a pair of pulleys. Each motion transmission 34 is responsible for the reciprocating translation of the related carriage along the guide 30.

FIG. 18 shows an alternative solution where the actuating means 33 comprise more than one fluid-dynamic jack 38 actuating the sliding means 3. In the example shown in the figure there is a pair of fluid-dynamic jacks 38. In particular, in the embodiment of the machine 1 illustrated in FIG. 16 each fluid-dynamic jack 38 actuates a related carriage.

The embodiment illustrated in FIG. 16 may be obtained from the embodiment illustrated in FIG. 15 by physically disengaging the first portion 361 of the carriage 36 from the second portion 362 of the carriage 36 (thus obtaining two distinct carriages), and by providing each of the first and second portions 361, 362 of the carriage 36 with separate actuating means (for example with either separate motion transmissions 34 or with separate fluid-dynamic jacks 38).

In the embodiment illustrated in FIG. 16, a pair of first transducers 60 may be provided to directly detect the relative displacement between the tube and the first and second cutting plane 310, 320. Each first transducer 60 is devoted to the detection of the relative displacement between the tube and one respective carriage. Each first transducer 60 may comprise a respective encoder 600 supported by the respective carriage. Alternatively, or contemporarily, together with the third transducer 62, a pair of second transducers 61 may be provided to detect the absolute displacement of the sliding means 3. Each second transducer 61 is devoted to the detection of the absolute displacement of one respective carriage. Each second transducer 61 may comprise a respective encoder 610, which may be integrated in a respective motor which drives the motion transmission 34 devoted to the movement of the respective carriage (as illustrated in FIG. 16), or it may be put in contact with the sliding means 3 (in particular with the respective carriage) or with parts thereof, either directly or through various mechanical systems (as schematically illustrated for example in FIG. 18).

Figure 3:
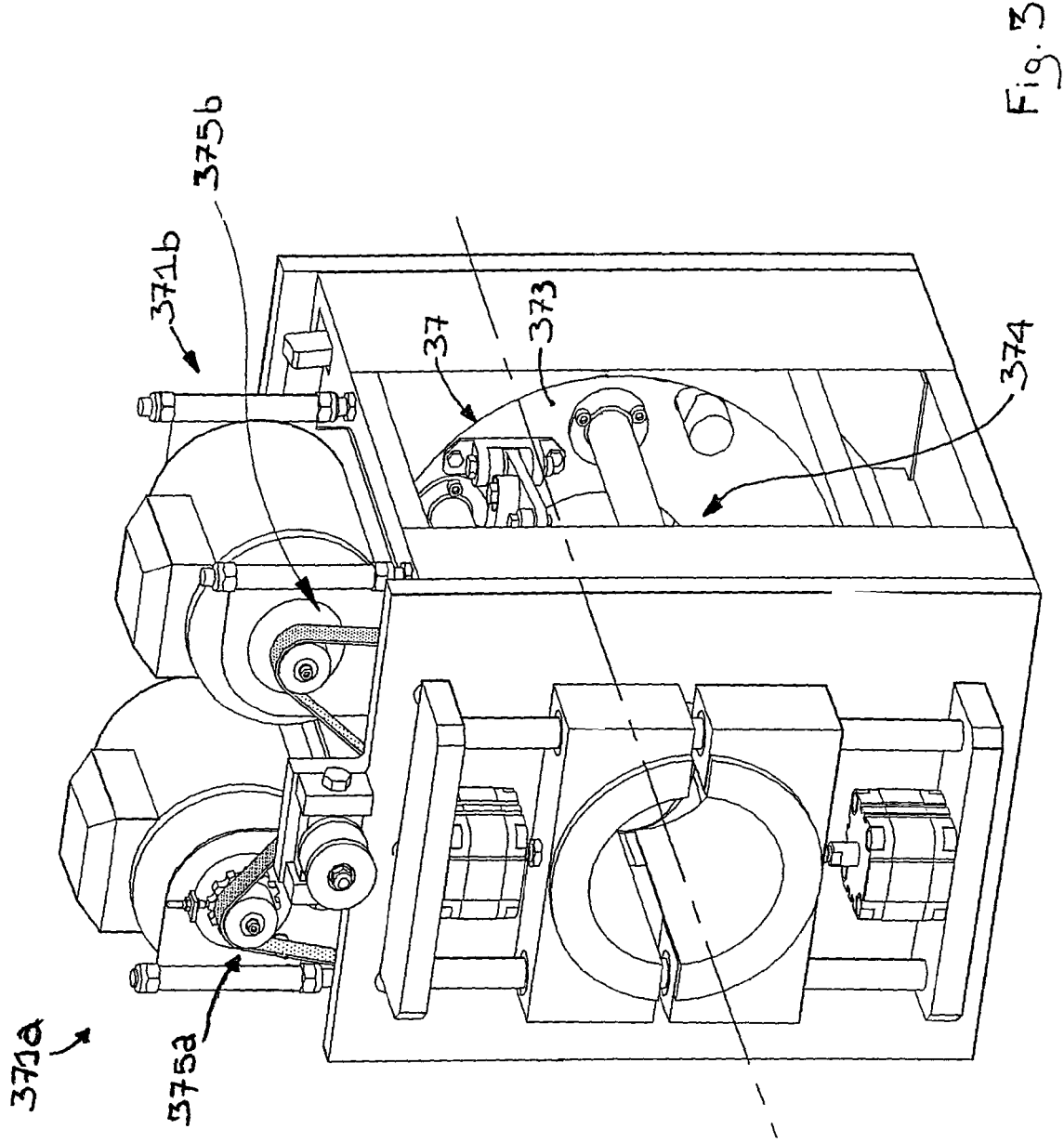
FIG. 3 shows a portion of the machine according to the present invention shown in FIG. 1.

In general, both the first and the second cutting station 31, 32 comprise: a drum 37 rotatable around a horizontal axis, first motorisation means 371a of the drum 37, means 372 for calibrating the cutting tools (see, for example, FIG. 3). The horizontal axis of rotation of the drum is coaxial with the longitudinal axis of development of the tube parallel to the direction 20 of advance. Advantageously, if the cutting tool is rotatable around its own axis, both the first and the second cutting station 31, 32 comprise second motorisation means 371b for actuating the cutting tools that enable the tool to rotate around its own axis of rotation.

The drum 37 is defined by two planar flanges 373, with annular shape, mutually parallel which are rigidly interconnected by interposed spacers. The drum 37 is axially traversed for its entire length by a cavity 374 able to be travelled by the tube longitudinally and coaxially with the axis of rotation of the drum 37. The shearing cutter is supported by the drum 37 in such a way as to project in the cavity 374, transversely to the axis of rotation of the drum 37. Advantageously, two cutting tools are present, on diametrically opposite positions relative to the axis of rotation of the drum 37 in order to be able to operate simultaneously on opposite circumference arcs of the tube and enable the cutting of the tube by means of a single rotation of the drum 37 around its axis of rotation. As exemplified in FIG. 3, the first and the second motorisation means 371a, 371b include motor members which are positioned externally to the rotatable drum 37 and are supported in stationary fashion by the sliding means 3. This enables to reduce the inertia of the rotating drum and make the cutting operations more rapid. In particular, the first motorisation means 371a include a motion transmission 375a which is operatively interposed between the motor member and the drum 37. The second motorisation means 371b include a motion transmission 375b which is operatively interposed between the motor member and the rotatable cutting tools. A similar configuration is known and described in the Italian patent application for industrial invention No. RN2003A000014 whose content is fully recalled herein.

The gripping means 50 comprise vices 51 which in the first configuration are tightened on the tube.

Each vice 51 comprises at least one lower portion 511 and one upper portion 512 movable relative to each other, in the first configuration of the gripping means both the lower portion 511 and the upper portion 512 being tightened on the tube; in the second configuration of the gripping means 50 the upper portion 512 being moved away from the tube to allow the mutual sliding of the tube relative to the vice 51.

In particular, the lower portions 511 of the vices 51 support at least part of the segments of the cut tube. Advantageously, the vices 51 are aligned and define the direction 20 of advance. In particular, the surfaces of the vices 51 destined to come in contact with the tube define a channel for sliding. Said channel is interrupted between a vice and the other and it is advantageously coaxial to the tube. Astride the first cutting plane 310 there is a first pair of vices 51, astride the second cutting plane 320 there is a second pair of vices 51, said second pair of vices 51 being distinct from the first pair of vices 51. In particular, the first pair of vices is integral with the first cutting station 31, the second pair of vices is integral with the second cutting station 32.

Between the first and the second cutting plane 310, 320 there are two vices 51, one integral with the first cutting station 31 and one integral to the second cutting station 32. At least one of said two vices 51 interposed between the first and the second cutting plane 310, 320 comprises teeth 52 both complementarily shaped and opposite relative to recesses 53 obtained on the other vice 51; the insertion or extraction of the teeth 52 from the corresponding recesses 53 (see FIGS. 4, 5, 6) allowing the at least partial co-penetration of one vice 51 in the other to compensate for the motion towards or away from each other of the first and of the second cutting station 31, 32 along the direction 20 of advance. The motion of the first and of the second cutting station 31, 32 toward or away from each other causes the first and the second cutting plane 310, 320 to move toward or away from each other. The presence of said teeth 52 and of the respective recesses 53 enables to approach the first cutting plane 310 to the second cutting plane 320 as far as possible and simultaneously enables the lower portion 511 of the vices 51 to support the tube segments even when the two vices 51 integral to the cutting stations 31, 32 are in a configuration of maximum mutual distancing. One of said two vices 51 interposed between the first and the second cutting plane 310, 320 is a part of the first pair of vices, the other is a part of the second pair of vices.

Under the control of the control means (and/or of the various control units provided in the machine 1) the actuating means 33 may be used as positioning means, to position the first and second cutting plane 310, 320 at a desired mutual distance.

The present invention further relates to a method for cutting a continuously extruded tube into segments of lesser and predetermined length by means of a cutting machine according to the present invention.

To said machine 1 and to its components, constant reference shall be made hereafter.

Said method comprises the step of positioning the tube in a work area of the cutting machine 1. Advantageously, the tube is positioned placing its own axis of longitudinal development parallel to said guide 30 of the cutting machine 1. The method also comprises the step of making the tube advance along the direction 20 of advance according to the sense 21 of advance. The direction 20 of advance is advantageously parallel to the direction of development of the guide 30.

The method further comprises the step of positioning the first and the second cutting plane 310, 320 at a mutual distance equal to:

$$n \cdot (L) + K \text{ where:}$$

n: is a natural number greater than 0;
L: is the preferential length of the desired tube segments outputted by the machine, measured along the direction 20 of advance of the tube;
K: is a first corrective coefficient that takes into account the length, measured along the direction of advance of the tube, of the scrap generated by the first and/or by the second shearing cutter 311, 312.

The method further comprises synchronising to the motion of the tube the motion of the first and of the second cutting plane 310, 320 along the direction 20 of advance.

Subsequently, at least in part simultaneously, by means of the first and of the second cutter 311, 312, a first and a second cut of the tube is executed at the first and the second cutting plane 310, 320.

Advantageously, said cutting operation is executed wholly simultaneously by the first and by the second cutter 311, 312.

Advantageously, after executing the first and the second cut, if the natural number n is greater than 1, the implementation of a first iterative procedure is activated, each iteration whereof being identified by a progressive reference index i whose initial value is unitary. Said first procedure is interrupted when the progressive reference index i assumes a value equal to the natural number n; each iterative cycle of said first procedure comprises the three following steps:

determining a displacement relative to the tube of the first and of the second cutting plane 310, 320 from initial positions to new positions located (advantageously taking as reference the tube and not a reference fixed in space) upstream of the corresponding initial positions relative to the first sense 21 of advance of the tube; in the initial positions and in the new positions, the displacement of the first and of the second cutting plane 310, 320 along the direction 20 of advance being synchronised to that of the tube;

the displacement of the first cutting plane 310 is evaluated relative to a point integral with the portion of tube that in the initial position of the first cutting plane 310 is placed, relative to the first sense of advance 21 of the tube, immediately upstream of the first shearing cutter 311, said displacement of the first cutting plane 310 being provided by the following formula:

$$L + Y$$

where:
L: is the preferential length of the desired tube segments outputted by the machine, measured along the direction of advance of the tube;
Y: is a second corrective coefficient to take into account the length, measured along the direction of advance of the tube, of the scrap generated by the first and/or by the second shearing cutter 311, 312;

the displacement of the second cutting plane 320 being evaluated relative to a point integral with the portion of tube that in the initial position of the second cutting plane 320 is placed, relative to the first sense of advance 21 of the tube, immediately upstream of the second shearing cutter 312, said displacement of the second cutting plane 320 being provided by the following formula:

$$L + X$$

where:
L: is the preferential length of the desired tube segments outputted by the machine, measured along the direction of advance of the tube;
X is a third corrective coefficient to take into account the length, measured along the direction of advance of the tube, of the scrap generated by the first and/or by the second shearing cutter 311, 312;

cutting the tube in the new positions of the first and of the second cutting plane 310, 320 by means of the first and of the second shearing cutter 311, 312;

increasing by one unit the value of the progressive reference index i.

The first procedure thus comprises a number of iterative cycles equal to the natural number n minus one unit.

If one neglects the scrap generated by the first shearing cutter 311, then the second corrective coefficient Y is nil. If the scrap generated by the second shearing cutter 312 is neglected, then the third corrective coefficient X is nil.

In particular, the value of the second corrective coefficient Y is equal to the length of the scrap generated by the first shearing cutter 311 and measured along the direction 20 of advance of the tube.

The value of the third corrective coefficient X is equal to the length of the scrap generated by the second shearing cutter 312 and measured along the direction 20 of advance of the tube.

If the length of the scrap generated by the first and by the second shearing cutter 311, 312 and measured along the direction 20 of advance is identical, then the second and the third corrective coefficient Y, X assume the same value. Normally, in such cases the first and the second shearing cutters 311, 312 are identical (preferred solution).

Appropriately, the method comprises a second iterative procedure that is activated if the progressive reference index i is greater than 1 and assumes a value equal to the natural number n and if the sliding means 3 are at a distance greater than a predetermined distance from the stroke-end 302 of the guide 30 or if the natural number n is unitary and the sliding means 3 are at a distance greater than a predetermined distance from the stroke-end 302 of the guide 30; said predetermined distance depends on the operating parameters of the machine 1, e.g. on the preferential length L of the segments, on the value of the natural number n, on the velocity of advance of the tube, etc. Said second iterative procedure is interrupted when, at the end of an iterative cycle, the sliding means 3 are at a lesser distance than the predetermined distance from the stroke-end 302 of the guide 30; every operating cycle of said second procedure comprises the following steps:

determining a displacement relative to the tube of the first and of the second cutting plane 310, 320 from initial positions to new positions located (advantageously taking as reference the tube and not a reference fixed in space) upstream of the corresponding initial positions relative to the first sense 21 of advance of the tube; in the initial positions and in the new positions, the displacement of the first and of the second cutting plane 310, 320 along the direction 20 of advance being synchronised to that of the tube;

the displacements of the first and of the second cutting plane 310, 320 being evaluated relative to a point integral with the portion of tube that in the initial position of the second cutting plane 320 is placed, relative to the first sense of advance 21 of the tube, immediately upstream of the second shearing cutter 312, the displacements of the first and of the second cutting plane 310, 320 being respectively provided by the following formulas:

$$(n+1) \cdot L + H$$

$$(n+1) \cdot L + Z$$

where:
n: is the natural number greater than 0;
L: is the preferential length of the desired tube segments outputted by the machine, measured along the direction of advance of the tube;
H is a fourth corrective coefficient to take into account the length, measured along the direction of advance of the tube, of the scrap generated by the first and/or by the second shearing cutter 311, 312;
Z: is a fifth corrective coefficient to take into account the length, measured along the direction of advance of the tube, of the scrap generated by the first and/or by the second shearing cutter 311, 312;
  cutting the tube in the new positions of the first and of the second cutting plane 310, 320 by means of the first and of the second shearing cutter 311, 312;
  activating said first procedure again if the natural number n is greater than 1.

If one neglects the scraps of the tube generated both by the first and by the second shearing cutter 311, 312, then the values of the fourth corrective coefficient H and of the fifth corrective coefficient Z are nil.

More in general, the value of the fourth and of the fifth corrective coefficient are given by the following relationships:

$$H = S_1 + S_2$$

$$Z = n \cdot S_1 + S_2$$

where:
n: is the natural number greater than 0;
H is the fourth corrective coefficient to take into account the length, measured along the direction of advance of the tube, of the scrap generated by the first and/or by the second shearing cutter 311, 312;
Z is the fifth corrective coefficient to take into account the length, measured along the direction of advance of the tube, of the scrap generated by the first and/or by the second shearing cutter 311, 312;
$S_1$ is the length of the scrap generated by the first shearing cutter 311;
$S_2$ is the length of the scrap generated by the second shearing cutter 312.

Advantageously, the first and the second and the third and the fourth and the fifth corrective coefficient assume two alternative sets of values; a first set of values in which the first, as well as the second, as well as the third, as well as the fourth, as well as the fifth corrective coefficient are nil, in this case neglecting the scrap of the tube generated by the first and by the second shearing cutters 311, 312.

Alternatively, to take into account the scrap of the tube generated by the first and by the second shearing cutter 311, 312, a second set of value is provided in which the first, the second, the third, the fourth, the fifth coefficient assume the values provided by the following relationships:

$$K = (n-1) \cdot S_1$$

$$Y = S_1$$

$$X = S_2$$

$$H = S1 + S2$$

$$Z = n \cdot S1 + S2$$

where:
n: is the natural number greater than 0;
L: is the preferential length of the desired tube segments outputted by the machine, measured along the direction of advance 20 of the tube;
K: is the first corrective coefficient to take into account the length, measured along the direction of advance of the tube, of the scrap generated by the first and/or by the second shearing cutter 311, 312;
Y is the second corrective coefficient to take into account the length, measured along the direction of advance of the tube, of the scrap generated by the first and/or by the second shearing cutter 311, 312;
X is the third corrective coefficient to take into account the length, measured along the direction of advance of the tube, of the scrap generated by the first and/or by the second shearing cutter 311, 312;
H is the fourth corrective coefficient to take into account the length, measured along the direction of advance of the tube, of the scrap generated by the first and/or by the second shearing cutter 311, 312;
Z is the fifth corrective coefficient to take into account the length, measured along the direction of advance of the tube, of the scrap generated by the first and/or by the second shearing cutter 311, 312;
$S_1$ is the length of the scrap generated by the first shearing cutter 311;
$S_2$ is the length of the scrap generated by the second shearing cutter 312.

If the sliding means 3, when the progressive reference index i assumes the value of the natural number n, are at a lesser distance than said predetermined distance from the stroke-end 302 of the guide 30, they will return to the stroke-start 301 of the guide 30. Following a cutting action by the first shearing cutter 311, downstream of said first shearing cutter 311 a segment will be generated having greater length than the preferential length L of the desired segments outputted by the machine and the method does not provide for said long segment to be further worked on by the machine 1. Anyway, said long segment is not discarded, as it can still be used in applications where a longer tube is required. In general, said long segment has a length whose value is pre-set and of interest (e.g. to increase stocks of tubes of a certain length).

The first iterative procedure, if the progressive reference index i is smaller than the natural number n, provides for the step of moving the first and the second cutting plane 310, 320 from the initial positions to the new positions, comprises the step of mutually approaching (advantageously, by the regulating means 330) the second cutting plane 320 and the first cutting plane 310 by a quantity equal to the second corrective coefficient Y. Neglecting the scrap generated by the second shearing cutter 312, based on the above description, the approach of the first and of the second cutting plane 310, 320 becomes nil as well.

The approach enables to compensate for the fact that in the immediately preceding cut the second shearing cutter 312 removed a scrap from the tube along the direction 20 of advance (normally equal to the value of the thickness of the second shearing cutter 312). As a result of the advance of the tube portion outputted by the extruder, the two edges of the tube generated by the cutting action of the second shearing cutter 312 will very quickly come in contact and in the absence of the mutual approach of the two cutting planes 310, 320, it would no longer be possible to produce tube segments of the preferential length L. The control means govern the motion of the sliding means 3 taking into account the time required for the two edges to come in contact; said time is equal to the length of the scrap measured along the direction 20 of advance of the tube in relation to the velocity of advance of the tube.

If the progressive reference index i assumes a value equal to the natural number n, the method comprises the step of bringing back (advantageously by the regulating means 330) the distance between the first and the second cutting plane 310, 320 to the distance given by the formula $$n \cdot (L) + K$$

where:
n is the natural number greater than 0;
L is the preferential length of the desired tube segments outputted by the machine, measured along the direction of advance of the tube;
K is the first corrective coefficient to take into account the length, measured along the direction of advance of the tube, of the scrap generated by the first and/or by the second shearing cutter 311, 312.

The method further comprises the step of setting the value L of the preferential length of the desired tube segments outputted by the machine 1, measured along the direction of advance of the tube. Said step is usually conducted before starting the cutting operations and it is important to determine the mutual distance whereat the first and the second cutting planes 310, 320 are to be set.

The method provides in any case for the possibility of regulating the mutual distance of the first and of the second cutting plane 310, 320, this being possible also during the normal operation of the cutting machine 1 which will thus comply with the new instructions.

Once the value L of the preferential length is chosen, the method provides for choosing the minimum value of "n" that enables to obtain the value expressed by the following relationship:

$$n \cdot L + K$$

between a minimum and a maximum pre-set value.

With reference to FIGS. 9 through 11, an illustrative example of the invention is described below.

Suppose a polypropylene tube is to be machined, with diameter 110 mm and thickness 2.7 mm, and that bellmouth tubes are to be produced with preferential length L equal to 230 mm (including the part of tube, e.g. 80 mm long, whereon the bellmouth is to be formed). For the sake of simplicity, let it be assumed that the shearing cutter determines no cutting scrap.

Let it be supposed that the geometric configuration of the machine 1 enables a regulation of the distance between the first and the second cutting plane 310, 320 from a minimum distance of 500 mm to a maximum distance of 700 mm. The length of the segment (230 mm) being smaller than the minimum value of said interval, the first and the second cutting plane 310, 320 are positioned at a mutual distance equal to three times the desired distance (n=3, thus 230 mm×3=690 mm).

Initially, the sliding means 3 are at the stroke-start 301 of the guide 30. In this position, the sliding means 3 wait for an adequate segment of tube to slide, then they start translating along the tube and as soon as they reach a velocity near the velocity of the tube and as soon as they position the first cutting plane 310 at a distance from the end of the tube equal to the preferential length L, the vices 51 are closed and the cutting operation is executed (see FIG. 9).

Using the two cutting stations 31, 32, a first segment of length equal to the preferential length L and a second segment of length equal to three times the preferential length L are obtained. Once the cutting operation is completed, the vices 51 are opened and the sliding means 3 start to return towards the stroke-start 301 of the guide 30. During this return phase, the tube continues to slide in opposite direction and the relative displacements are detected between the tube and the first and the second cutting plane 310, 320 (given by the sum of the absolute displacements of the cutting planes 310, 320 and of the tube). Subsequently, the sliding means 3 stop and resume the motion in the opposite direction. When the sliding means 3 have velocity proximate to the velocity of advance of the tube and the first cutting plane 310 is positioned at one third of the second segment previously generated (and maintaining unaltered the relative distance of the first and of the second cutting plane 310, 320), the vices 51 close and a cutting operation is executed (see FIG. 10). With said cutting action, 2 additional segments with preferential length L are obtained as well as a third segment whose length is twice the preferential length L. Subsequently (in the manner described above) the first cutting plane 310 is moved relative to the tube in such a way as to position the first cutting plane 310 at half the third segment, previously generated. In this case, too, the relative distance of the first and of the second cutting plane 310, 320 is kept unaltered. With an additional cutting action executed by the first and by the second cutting station 31, 32, three additional segments with preferential length L are obtained (see FIG. 11). The machine has thus executed a work cycle and with three cutting actions, 6 segments having length equal to the preferential length have been obtained. It is evident that the traditional machine configured with a single cutting plane would, in the same working time, have obtained a smaller number of segments. Subsequently, the first cutting plane 310 is positioned upstream (relative to the first sense of advance 21 of the tube) and at a distance from the end of the as-yet uncut tube portion equal to the preferential length L. A cutting operation is executed, again obtaining a segment with length L equal to the preferential length and a segment whose length is equal to three times the preferential length. Subsequently, the operations described above are repeated, to cut the long segment just generated into segments having preferential length L and so on.

At the end of one of the work cycles described above, if the sliding means 3 have no more travel available because they are too close to the stroke-end 302 of the guide 30, they can return in proximity to the stroke-start position 301. With a subsequent cutting operation, downstream of the first cutting plane 310 a segment is generated with a length that is usually pre-set before starting the machining (not necessarily multiple of the desired preferential length L), whilst between the first and the second cutting plane 310, 320 a segment is generated that is equal to or multiple of the desired preferential length L; then, the execution of the various cutting cycles as described previously is resumed. In FIGS. 9 through 11, the dashed lines orthogonal to the tube represent the areas that will be cut from the cutting planes in the subsequent steps.

FIGS. 12 through 14 show the same steps shown in FIGS. 9 through 11, if the scrap generated by the first and/or by the second cutter 311, 312 is not neglected. The scrap generated by the corresponding cutter is shown as a thick line, orthogonal to the tube.

The invention achieves important advantages.

First of all, it enables to obtain a high machining rate.

Another important advantage is that it allows relatively small dimensions of the machine.

The invention thus conceived can be subject to numerous modifications and variants, without thereby departing from the scope of the inventive concept that characterises it.

Moreover, all details can be replaced by other, technically equivalent elements. In practice, all materials employed, as well as dimensions, may be any, according to requirements.

The invention claimed is:

1. A method for cutting a continuously extruded tube into segments of lesser and predetermined length by means of a cutting machine, the cutting machine comprising:

a guide that develops between a stroke-start and a stroke-end;

sliding means that are movable along the guide parallel to a direction of advance of the tube along which the tube is to proceed according to a first sense of advance oriented from the stroke-start to the stroke end of the guide;

means for actuating said sliding means along the guide;

said sliding means comprising a first station for cutting the tube, said first cutting station comprising in turn a first shearing cutter defining a first cutting plane transverse to the direction of advance;

said sliding means comprising:

a second station for cutting the tube positioned upstream of the first cutting station with respect to the first sense of advance of the tube along the direction of advance, said second cutting station comprising a second shearing cutter distanced from the first shearing cutter and defining a second cutting plane that is transverse to the direction of advance of the tube;

means for gripping tube portions, said gripping means being positioned, relative to the first sense of advance of the tube, upstream of the first cutting plane, downstream of the second cutting plane and between the first and the second cutting plane; said gripping means being movable between a first configuration in which they securely grip corresponding tube portions and a second configuration in which they release said tube portions;

said cutting machine further comprising means for controlling the actuating means and means for measuring the relative displacement between said tube and said first and second cutting plane along the direction of advance; before every cut and on the command of the control means, the actuating means being able to synchronise with the motion of the tube the motion of each cutting station along the direction of advance, positioning the first and the second cutting plane at desired positions on the tube;

the control means commanding said actuating means of said sliding means at least according to the information provided by said measuring means and to the desired length of the tube segments to be produced with the machine;

once the synchronisation is completed, before each cut, said gripping means assume said first configuration to keep in position tube segments positioned at the first and at the second cutting plane, said second configuration being assumed after each cut to allow the relative motion of the tube and of the sliding means along the direction of advance of the tube;

the method comprising the steps of:

positioning the tube in a work area of the cutting machine;

making the tube advance along the direction of advance according to the first sense of advance;

positioning the first and the second cutting plane at a mutual distance equal to:

$$n \cdot (L) + K$$

where:

n: is a natural number greater than 0;

L: is a preferential length of the desired tube segments outputted by the machine, measured along the direction of advance of the tube;

K: is a first corrective coefficient to take into account the length, measured along the direction of advance of the tube, of the scrap generated by the first and/or by the second shearing cutter;

synchronising to the motion of the tube the motion of the first and of the second cutting plane along the direction of advance;

executing at least in part simultaneously, by means of the first and of the second cutter, a first and a second cut of the tube at the first and the second cutting plane.

2. A method as claimed in claim 1, wherein after executing the first and the second cut, if the natural number n is greater than 1, the implementation of a first iterative procedure is activated, each iteration whereof being identified by a progressive reference index i whose initial value is unitary, said first procedure being interrupted when the progressive reference index i assumes a value equal to the natural number n; each iterative cycle of said first procedure comprising the steps of:

determining a displacement relative to the tube of the first and of the second cutting plane from initial positions to new positions located upstream of the corresponding initial positions relative to the first sense of advance of the tube, in the initial positions and in the new positions the displacement of the first and of the second cutting plane along the direction of advance being synchronised to that of the tube;

the displacement of the first cutting plane being evaluated relative to a point integral with the portion of tube that in the initial position of the first cutting plane is placed, relative to the first sense of advance of the tube, immediately upstream of the first shearing cutter, said displacement of the first cutting plane being provided by the following formula:

$$L+Y$$

where:

L is the preferential length of the desired tube segments outputted by the machine, measured along the direction of advance of the tube;

Y is a second corrective coefficient to take into account the length, measured along the direction of advance of the tube, of the scrap generated by the first and/or by the second shearing cutter;

the displacement of the second cutting plane being evaluated relative to a point integral with the portion of tube that in the initial position of the second cutting plane is placed, relative to the first sense of advance of the tube, immediately upstream of the second shearing cutter, said displacement of the second cutting plane being provided by the following formula:

$$L+X$$

where:

L is the preferential length of the desired tube segments outputted by the machines, measured along the direction of advance of the tube;

X is a third corrective coefficient to take into account the length, measured along the direction of advance of the tube, of the scrap generated by the first and/or by the second shearing cutter;

cutting the tube in the new positions of the first and of the second cutting plane by means of the first and of the second shearing cutter;

increasing by one unit the value of the progressive reference index i.

3. A method as claimed in claim 2, comprising a second iterative procedure that is activated if the progressive reference index i is greater than 1 and assumes a value equal to the natural number n and if the sliding means are at a distance greater than a predetermined distance from the stroke-end of the guide; said second iterative procedure is interrupted when, at the end of an iterative cycle, the sliding means are at a lesser distance than the predetermined distance from the stroke-end of the guide; every operating cycle of said second procedure comprises the following steps:

determining a displacement relative to the tube of the first and of the second cutting plane from initial positions to new positions located upstream of the corresponding initial positions relative to the first sense of advance of the tube, in the initial positions and in the new positions, the displacement of the first and of the second cutting plane along the direction of advance being synchronised to that of the tube;

the displacements of the first and of the second cutting plane being evaluated relative to a point integral with the portion of tube that in the initial position of the second cutting plane is placed, relative to the first sense of advance of the tube, immediately upstream of the second shearing cutter, the displacements of the first and of the second cutting plane being respectively provided by the following formulas:

$$(n+1) \cdot L + H$$

$$(n+1) \cdot L + Z$$

where:
n: is the natural number greater than 0;
L: is the preferential length of the desired tube segments outputted by the machine, measured along the direction of advance of the tube;
H: is a fourth corrective coefficient to take into account the length, measured along the direction of advance of the tube, of the scrap generated by the first and/or by the second shearing cutter;
Z: is a fifth corrective coefficient to take into account the length, measured along the direction of advance of the tube, of the scrap generated by the first and/or by the second shearing cutter;

cutting the tube in the new positions of the first and of the second cutting plane by means of the first and of the second shearing cutter;

activating the first procedure again.

4. A method as claimed in claim 3, wherein the first and the second and the third and the fourth and the fifth corrective coefficient assume two sets of alternative values:

a first set of values in which the first, as well as the second, as well as the third, as well as the fourth, as well as the fifth corrective coefficient are nil, in this case neglecting the scrap of the tube generated by the first and by the second shearing cutters;

a second set of values in which the first, the second, the third, the fourth and the fifth corrective coefficient take into account the scrap generated by the first and/or by the second shearing cutter, in this case to each shearing cutter being associated multiple shearing planes within an interval defined by the length of the scrap generated by the corresponding cutter along the direction of advance of the tube, the first and the second cutting planes coinciding with the two mutually closest shearing planes, generated at least in part simultaneously one by the first shearing cutter and one by the second shearing cutter; in the second set of values, the first, the second, the third, the fourth and the fifth corrective coefficient assume the values provided by the following relationships:

$$K = (n-1) \cdot S1$$

$$Y = S1$$

$$X = S2$$

$$H = S1 + S2$$

$$Z = n \cdot S1 + S2$$

where:
n: is the natural number greater than 0;
L: is the preferential length of the desired tube segments outputted by the machine, measured along the direction of advance of the tube;
K: is the first corrective coefficient to take into account the length, measured along the direction of advance of the tube, of the scrap generated by the first and/or by the second shearing cutter;
Y is the second corrective coefficient to take into account the length, measured along the direction of advance of the tube, of the scrap generated by the first and/or by the second shearing cutter;
X is the third corrective coefficient to take into account the length, measured along the direction of advance of the tube, of the scrap generated by the first and/or by the second shearing cutter;
H is the fourth corrective coefficient to take into account the length, measured along the direction of advance of the tube, of the scrap generated by the first and/or by the second shearing cutter;
Z is the fifth corrective coefficient to take into account the length, measured along the direction of advance of the tube, of the scrap generated by the first and/or by the second shearing cutter;
S1 is the length of the scrap, measured along the direction of advance of the tube, generated by the first shearing cutter;
S2 is the length of the scrap, measured along the direction of advance of the tube, generated by the second shearing cutter.

5. A method as claimed in claim 4, wherein said first iterative procedure, if the progressive reference index i is smaller than the natural number n, provides for the step of moving the first and the second cutting plane from the initial positions to the new positions, comprises the step of mutually approaching the second cutting plane and the first cutting plane by a quantity equal to the second corrective coefficient Y.

6. A method as claimed in claim 5, comprising the following step when the progressive reference index i assumes a value equal to the natural number n: bringing back the distance between the first and the second cutting plane to the distance given by the following formula:

$$n \cdot L + K$$

where
- n: is a natural number greater than 0;
- L: is the preferential length of the desired tube segments outputted by the machine, measured along the direction of advance of the tube;
- K: is the first corrective coefficient to take into account the length, measured along the direction of advance of the tube, of the scrap generated by the first and/or by the second shearing cutter.

7. A method as claimed in claim 2, wherein said first iterative procedure, if the progressive reference index i is smaller than the natural number n, provides for the step of moving the first and the second cutting plane from the initial positions to the new positions, comprises the step of mutually approaching the second cutting plane and the first cutting plane by a quantity equal to the second corrective coefficient Y.

8. A method as claimed in claim 7, comprising the following step when the progressive reference index i assumes a value equal to the natural number n: bringing back the distance between the first and the second cutting plane to the distance given by the following formula:

$$i \cdot n \cdot L + K$$

where
- n: is a natural number greater than 0;
- L: is the preferential length of the desired tube segments outputted by the machine, measured along the direction of advance of the tube;
- K: is the first corrective coefficient to take into account the length, measured along the direction of advance of the tube, of the scrap generated by the first and/or by the second shearing cutter.

9. A method as claimed in claim 3, wherein said first iterative procedure, if the progressive reference index i is smaller than the natural number n, provides for the step of moving the first and the second cutting plane from the initial positions to the new positions, comprises the step of mutually approaching the second cutting plane and the first cutting plane by a quantity equal to the second corrective coefficient Y.

10. A method as claimed in claim 9, comprising the following step when the progressive reference index i assumes a value equal to the natural number n: bringing back the distance between the first and the second cutting plane to the distance given by the following formula:

$$n \cdot L + K$$

where
- n: is a natural number greater than 0;
- L: is the preferential length of the desired tube segments outputted by the machine, measured along the direction of advance of the tube;
- K: is the first corrective coefficient to take into account the length, measured along the direction of advance of the tube, of the scrap generated by the first and/or by the second shearing cutter.

11. A method as claimed in claim 1, wherein after executing the first and the second cut, if the natural number n is unitary and the sliding means are at a distance greater than a predetermined distance from the stroke-end of the guide, the implementation of a second iterative procedure is activated; said second iterative procedure is interrupted when, at the end of an iterative cycle, the sliding means are at a lesser distance than the predetermined distance from the stroke-end of the guide; every operating cycle of said second procedure comprises the following steps:

determining a displacement relative to the tube of the first and of the second cutting plane from initial positions to new positions located upstream of the corresponding initial positions relative to the first sense of advance of the tube, in the initial positions and in the new positions the displacement of the first and of the second cutting plane along the direction of advance being synchronised to that of the tube;

the displacements of the first and of the second cutting plane being evaluated relative to a point integral with the portion of tube that in the initial position of the second cutting plane is placed, relative to the first sense of advance of the tube, immediately upstream of the second shearing cutter, the displacements of the first and of the second cutting plane being respectively provided by the following formulas:

$$2 \cdot L + H$$

$$2 \cdot L + Z$$

where:
- L: is the preferential length of the desired tube segments outputted by the machine, measured along the direction of advance of the tube;
- H: is a fourth corrective coefficient to take into account the length, measured along the direction of advance of the tube, of the scrap generated by the first and/or by the second shearing cutter;
- Z: is a fifth corrective coefficient to take into account the length, measured along the direction of advance of the tube, of the scrap generated by the first and/or by the second shearing cutter;

cutting the tube in the new positions of the first and of the second cutting plane by means of the first and of the second shearing cutter.

12. A method as claimed in claim 11, wherein the first and the second and the third and the fourth and the fifth corrective coefficient assume two sets of alternative values:

a first set of values in which the first, as well as the second, as well as the third, as well as the fourth, as well as the fifth corrective coefficient are nil, in this case neglecting the scrap of the tube generated by the first and by the second shearing cutters;

a second set of values in which the first, the second, the third, the fourth and the fifth corrective coefficient take into account the scrap generated by the first and/or by the second shearing cutter, in this case to each shearing cutter being associated multiple shearing planes within an interval defined by the length of the scrap generated by the corresponding cutter along the direction of advance of the tube, the first and the second cutting planes coinciding with the two mutually closest shearing planes, generated at least in part simultaneously one by the first shearing cutter and one by the second shearing cutter; in the second set of values, the first, the second, the third, the fourth and the fifth corrective coefficient assume the values provided by the following relationships:

$$K = (n-1) \cdot S1$$

$$Y = S1$$

$$X = S2$$

$$H = S1 + S2$$

$$Z = n \cdot S1 + S2$$

where:
n: is the natural number greater than 0;
L: is the preferential length of the desired tube segments outputted by the machine, measured along the direction of advance of the tube;
K: is the first corrective coefficient to take into account the length, measured along the direction of advance of the tube, of the scrap generated by the first and/or by the second shearing cutter;
Y is the second corrective coefficient to take into account the length, measured along the direction of advance of the tube, of the scrap generated by the first and/or by the second shearing cutter;
X is the third corrective coefficient to take into account the length, measured along the direction of advance of the tube, of the scrap generated by the first and/or by the second shearing cutter;
H is the fourth corrective coefficient to take into account the length, measured along the direction of advance of the tube, of the scrap generated by the first and/or by the second shearing cutter;
Z is the fifth corrective coefficient to take into account the length, measured along the direction of advance of the tube, of the scrap generated by the first and/or by the second shearing cutter;
S1 is the length of the scrap, measured along the direction of advance of the tube, generated by the first shearing cutter;
S2 is the length of the scrap, measured along the direction of advance of the tube, generated by the second shearing cutter.

13. A method as claimed in claim 12, wherein said first iterative procedure, if the progressive reference index i is smaller than the natural number n, provides for the step of moving the first and the second cutting plane from the initial positions to the new positions, comprises the step of mutually approaching the second cutting plane and the first cutting plane by a quantity equal to the second corrective coefficient Y.

14. A method as claimed in claim 13, comprising the following step when the progressive reference index i assumes a value equal to the natural number n: bringing back the distance between the first and the second cutting plane to the distance given by the following formula:

$$n \cdot L + K$$

where
n: is a natural number greater than 0;
L: is the preferential length of the desired tube segments outputted by the machine, measured along the direction of advance of the tube;
K: is the first corrective coefficient to take into account the length, measured along the direction of advance of the tube, of the scrap generated by the first and/or by the second shearing cutter.

15. A method as claimed in claim 11, wherein said first iterative procedure, if the progressive reference index i is smaller than the natural number n, provides for the step of moving the first and the second cutting plane from the initial positions to the new positions, comprises the step of mutually approaching the second cutting plane and the first cutting plane by a quantity equal to the second corrective coefficient Y.

16. A method as claimed in claim 15, comprising the following step when the progressive reference index i assumes a value equal to the natural number n: bringing back the distance between the first and the second cutting plane to the distance given by the following formula:

$$n \cdot L + K$$

where
n: is a natural number greater than 0;
L: is the preferential length of the desired tube segments outputted by the machine, measured along the direction of advance of the tube;
K: is the first corrective coefficient to take into account the length, measured along the direction of advance of the tube, of the scrap generated by the first and/or by the second shearing cutter.

17. A method as claimed in claim 1, comprising setting the value of the preferential length L of the desired tube segments outputted by the machine, measured along the direction of advance of the tube.

18. A method as claimed in claim 1, comprising electing the minimum value of "n" that allows to obtain the value expressed by the following relationship:

$$n \cdot L + K$$

between a minimum and a maximum pre-set value.

19. A method as claimed in claim 1, comprising regulating the mutual distance of the first and of the second cutting plane.

20. A method as claimed in claim 1, wherein the value of the natural number n is greater than 1.

21. A machine for cutting a continuously extruded tube into segments of lesser and predetermined length, comprising:
a guide that develops between a stroke-start and a stroke-end;
sliding means that are movable along the guide parallel to a direction of advance of the tube along which the tube is to proceed according to a first sense of advance oriented from the stroke-start to the stroke end of the guide;
means for actuating said sliding means along the guide;
said sliding means comprising a first station for cutting the tube, said first cutting station comprising in turn a first shearing cutter defining a first cutting plane transverse to the direction of advance;
said sliding means comprising:
a second station for cutting the tube positioned upstream of the first cutting station with respect to the first sense of advance of the tube along the direction of advance, said second cutting station comprising a second shearing cutter distanced from the first shearing cutter and defining a second cutting plane that is transverse to the direction of advance of the tube;
means for gripping tube portions, said gripping means being positioned, relative to the first sense of advance of the tube, upstream of the first cutting plane, downstream of the second cutting plane and between the first and the second cutting plane; said gripping means being movable between a first configuration in which they securely grip corresponding tube portions and a second configuration in which they release said tube portions;
said cutting machine further comprising means for controlling the actuating means and means for measuring the relative displacement between said tube and said first and second cutting plane along the direction of advance; before every cut and on the command of the control means, the actuating means being able to synchronise with the motion of the tube the motion of each cutting station along the direction of advance, positioning the first and the second cutting plane at desired positions on the tube;

the control means commanding said actuating means of said sliding means at least according to the information provided by said measuring means and to the desired length of the tube segments to be produced with the machine;

once the synchronisation is completed, before each cut, said gripping means assume said first configuration to keep in position tube segments positioned at the first and at the second cutting plane, said second configuration being assumed after each cut to allow the relative motion of the tube and of the sliding means along the direction of advance of the tube; the cutting machine further comprising means for positioning the first and the second cutting plane at a mutual distance defined by the following formula:

$$n \cdot L + K$$

where:

n: is a natural number greater than 0;

L: is a preferential length of the desired tube segments outputted by the machine, measured along the direction of advance of the tube;

K: is a first corrective coeffiecient to take into account the length, measured along the direction of advance of the tube, of a scrap generated by the first and/or by the second shearing cutter.

22. A machine as claimed in claim 21, comprising a user interface to set the value of the preferential length L of the desired tube segments outputted by the machine.

23. A machine as claimed in claim 21, comprising an electronic unit that determines the value of the natural number n as a function of the value of the preferential length L of the desired segments outputted by the machine and of pre-set geometric parameters of the machine.

24. A machine as claimed in claim 21, wherein said actuating means comprise means for regulating the mutual distance of the first and of the second cutting plane.

25. A machine as claimed in claim 24, comprising a remote centre for controlling the regulating means which enables to activate the regulating means without stopping the machine.

26. A machine as claimed in claim 21, wherein said sliding means comprise:

a first carriage movable along said guiding means, on said first carriage being obtained the first cutting station;

a second carriage, movable parallel to the direction of advance of the tube, on said second carriage being obtained the second cutting station;

said first and second carriage being physically disengaged from each other at least along the direction of advance of the tube.

27. A machine as claimed in claim 21, wherein said gripping means comprise vices that in the first configuration are tightened on the tube.

28. A machine as claimed in claim 27, wherein each vice comprises at least one lower portion and one upper portion, movable relative to each other, in the first configuration of the gripping means both the lower portion and the upper portion being tightened on the tube, in the second configuration of the gripping means the upper portion being removed from the tube to enable the mutual sliding of the tube relative to the vice.

29. A machine as claimed in claim 28, wherein lower portions of the vices support at least part of the segments of the cut tube.

30. A machine as claimed in claim 27, wherein said vices are aligned and define the direction of advance.

31. A machine as claimed in claim 27, wherein astride the first cutting plane there is a first pair of vices, astride the second cutting plane there is a second pair of vices, said second pair of vices being distinct from said first pair of vices.

32. A machine as claimed in claim 27, wherein between the first and the second cutting plane there are two vices, one integral with the first cutting station and one integral with the second cutting station, at least one of said vices comprising teeth that are both complementarily shaped and opposite with respect to recesses obtained on the other vice, the insertion or the extraction of the teeth from the corresponding recesses allowing the at least partial co-penetration of a vice in the other, to compensate the mutual approach or separation of the first and of the second cutting station along the direction of advance.

33. A machine as claimed in claim 21, wherein the value of the natural number n is greater than 1.

* * * * *

UNITED STATES PATENT AND TRADEMARK OFFICE
CERTIFICATE OF CORRECTION

PATENT NO. : 8,630,730 B2
APPLICATION NO. : 12/665048
DATED : January 14, 2014
INVENTOR(S) : Tabanelli Page 1 of 1

It is certified that error appears in the above-identified patent and that said Letters Patent is hereby corrected as shown below:

In the Claims

Column 21, line 23, in Claim 8, please delete "i n•L+K" and insert therefor -- n • L + K --.

Signed and Sealed this
Twentieth Day of May, 2014

Michelle K. Lee
*Deputy Director of the United States Patent and Trademark Office*